(12) United States Patent
Hlinka et al.

(10) Patent No.: US 8,040,963 B2
(45) Date of Patent: Oct. 18, 2011

(54) METHOD FOR REDUCING PEAK-TO-AVERAGE POWER RATIO IN AN OFDM TRANSMISSION SYSTEM

(75) Inventors: Ondrej Hlinka, Bratislava (SK); Ondrej Hrdlicka, Bratislava (SK); Pavol Svac, Giraltovce (SK)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 253 days.

(21) Appl. No.: 12/223,649

(22) PCT Filed: Oct. 20, 2006

(86) PCT No.: PCT/EP2006/067624
§ 371 (c)(1),
(2), (4) Date: Sep. 3, 2009

(87) PCT Pub. No.: WO2007/090472
PCT Pub. Date: Aug. 16, 2007

(65) Prior Publication Data
US 2010/0002784 A1    Jan. 7, 2010

(30) Foreign Application Priority Data
Feb. 6, 2006  (EP) .................................. 06002385

(51) Int. Cl.
*H04K 1/10* (2006.01)
(52) U.S. Cl. ........ 375/260; 375/264; 375/267; 375/299; 375/347; 375/349
(58) Field of Classification Search .................. 375/260, 375/264, 299, 267, 347, 349
See application file for complete search history.

(56) References Cited

U.S. PATENT DOCUMENTS

| 7,711,032 B2 * | 5/2010 | Diaz Fuente ................... 375/146 |
| 2004/0136315 A1 * | 7/2004 | Chang ............................ 370/206 |
| 2006/0002582 A1 * | 1/2006 | Suehiro et al. ................. 382/100 |

OTHER PUBLICATIONS

Kim et al. A PAPR Reduction Method Using the Correlation of Information in OFDM Communication System, Aug. 1, 2005, IEEE, vol. 2, pp. 330-333.*
S. Han et al.; "An Overview of Peak-to Average power Ratio Reduction Techniques for Multicarrier Transmission"; IEEE Wireless Communications, May 2005, pp. 56-65.
International Search Report for Application No. PCT/EP2006/067624; mailed Jan. 19, 2007.
G. Lu et al., "Peak-to-average Power Ratio Reduction in OFDM Based on Transformation of Partial Transmit Sequences" Electronic Letters, vol. 42, No. 2, Jan. 19, 2006; 2 pages.
A.E. Jones et al., "Block Coding Scheme for Reduction of Peak to Mean Envelope Power Ratio of Multicarrier Transmission Schemes" Electronics Letters, vol. 30, No. 25, Dec. 8, 1994.; pp. 2098-2099.
A. E. Jones et al., "Combined Coding for Error Control and Increased Robustness to System Non-linearities in OFDM" Proceedings of 46th IEEE Vehicular Technology Conference, vol. 2, 1996, pp. 904-908.

(Continued)

*Primary Examiner* — Kabir A Timory
(74) *Attorney, Agent, or Firm* — Staas & Halsey LLP

(57) ABSTRACT

The Peak-to-Average Power Ratio in an OFDM transmission system is reduced based on a complementary parity coding in which the coding rules are derived from an appropriate autocorrelation property of transmitted symbol sequences.

6 Claims, 15 Drawing Sheets

OTHER PUBLICATIONS

V. Tarokh et al., "On the Computation and Reduction of the Peak-to-Average Power Ratio in Multicarrier Communications" IEEE Transactions on Communications, vol. 48, No. 1, Jan. 2000; pp. 37-44.

J.A. Davis et al., "Peak-to-Mean Power Control and Error Correction for OFDM Transmission using Golay Sequences and Reed-Muller Codes" Electronic Letters, vol. 33, No. 4, Feb. 13, 1997; pp. 267-268.

J. A. Davis et al., "Peak-to-Mean Power Control in OFDM, Golay Complementary Sequences, and Reed-Muller Codes" IEEE Transactions on Information Theory, vol. 45, No. 7, Nov. 1999; pp. 2397-2417.

T. Jiang et al., "Complement Block Coding for Reduction in Peak-to-Average Power Ratio of OFDM Signals" IEEE Radio Communications, Sep. 2005; pp. S17-S22.

\* cited by examiner

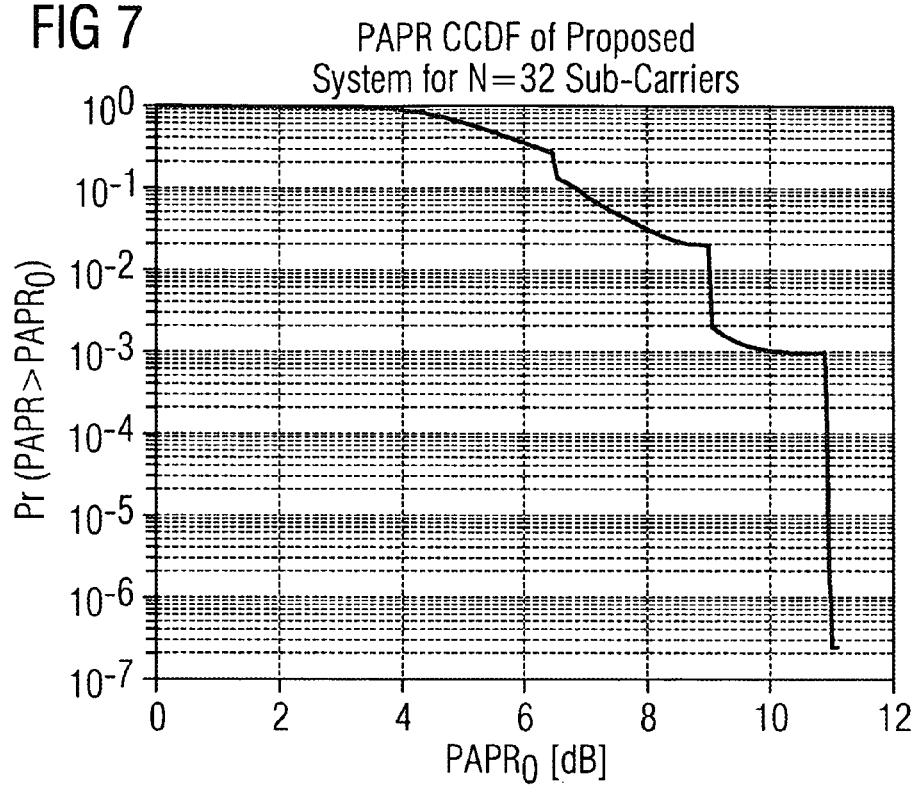
FIG 7  PAPR CCDF of Proposed System for N=32 Sub-Carriers
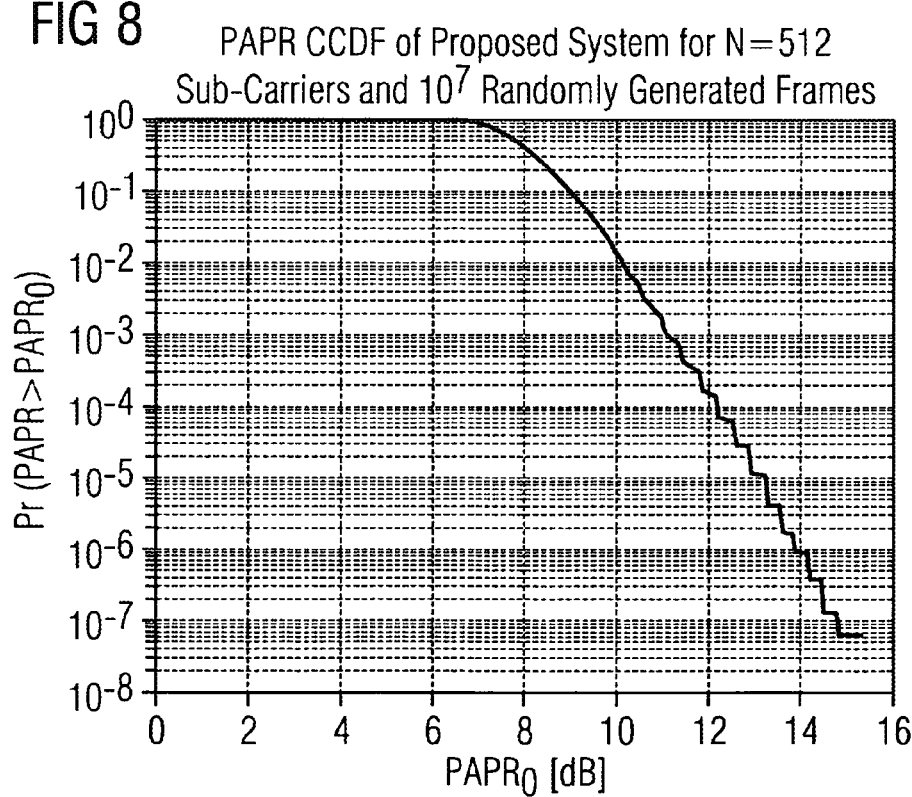
FIG 8  PAPR CCDF of Proposed System for N=512 Sub-Carriers and $10^7$ Randomly Generated Frames

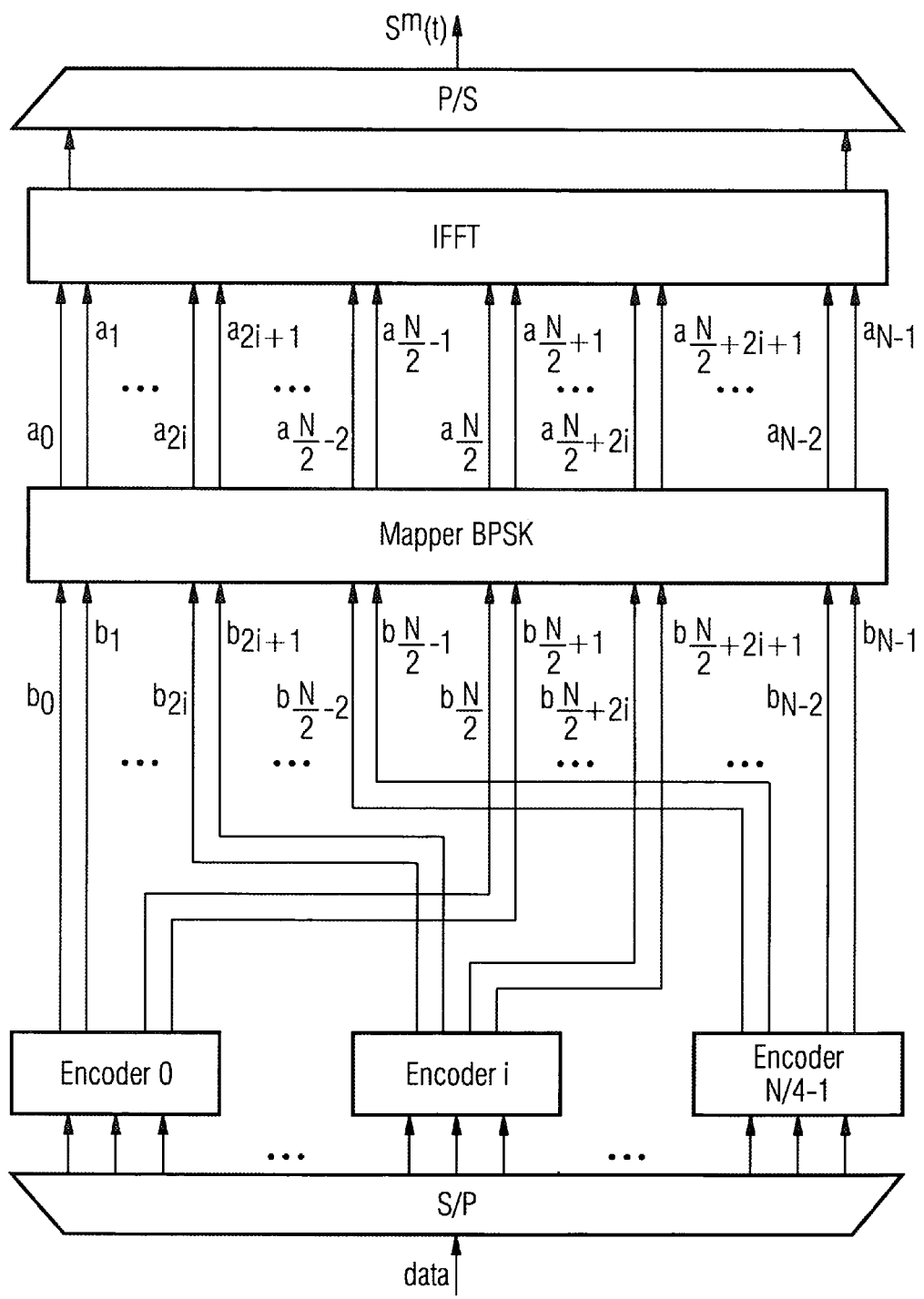
FIG 21   Proposal for OFDM Transmitter

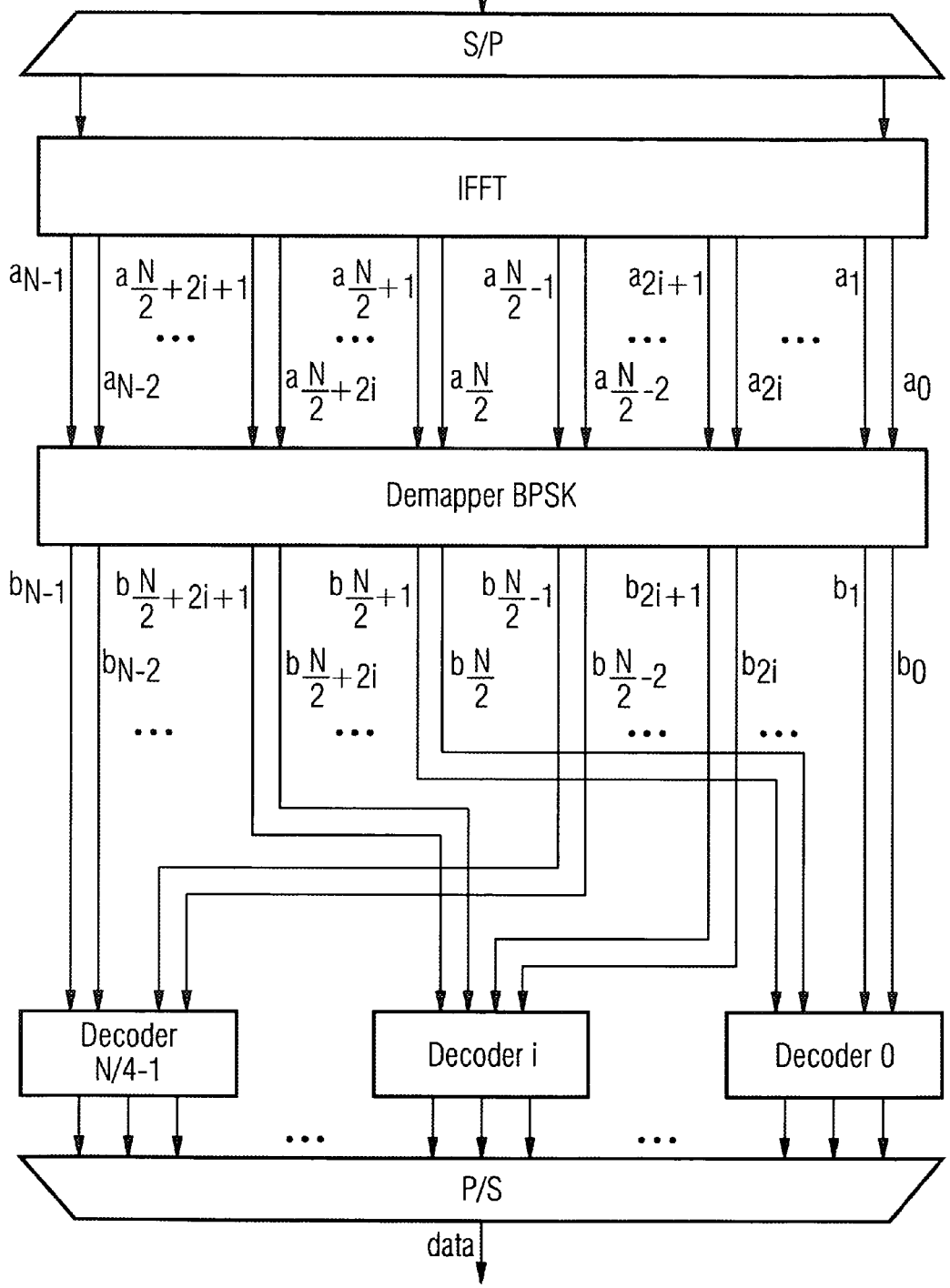
FIG 22 Proposal for OFDM Receiver

FIG 23

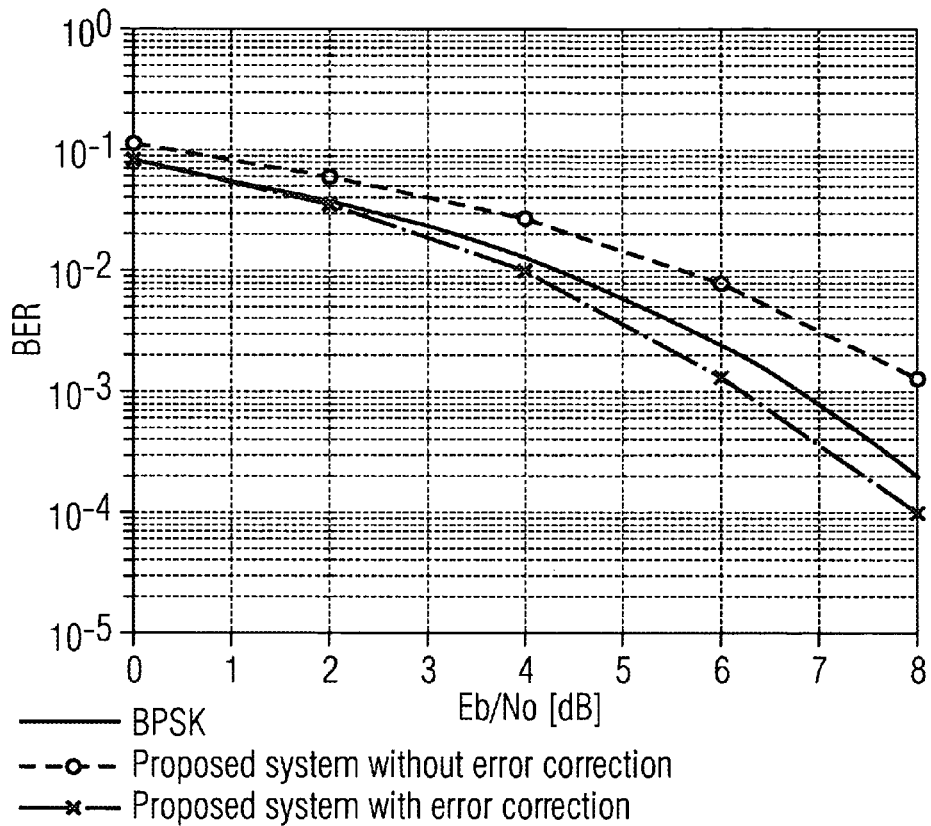

Comparison of Performance between the Reference System and Proposed Systems with and without Error Correction in AWGN Channel —— BPSK
− −o− − Proposed system without error correction
—×— Proposed system with error correction

FIG 24

Tab. 1: Evaluation of $\cos\left(\frac{2\pi}{T}\tau t\right)$ sampled at $t \in \langle 0, T \rangle$

|       | $\tau=1$ | $\tau=2$ | $\tau=3$ | $\tau=4$ | $\tau=5$ | $\tau=6$ | $\tau=7$ |
|-------|----------|----------|----------|----------|----------|----------|----------|
| t=0   | 1        | 1        | 1        | 1        | 1        | 1        | 1        |
| t=1/8 | $\sqrt{2}/2$ | 0 | $-\sqrt{2}/2$ | -1 | $-\sqrt{2}/2$ | 0 | $\sqrt{2}/2$ |
| t=2/8 | 0 | -1 | 0 | 1 | 0 | -1 | 0 |
| t=3/8 | $-\sqrt{2}/2$ | 0 | $\sqrt{2}/2$ | -1 | $\sqrt{2}/2$ | 0 | $-\sqrt{2}/2$ |
| t=4/8 | -1 | 1 | -1 | 1 | -1 | 1 | -1 |
| t=5/8 | $-\sqrt{2}/2$ | 0 | $\sqrt{2}/2$ | -1 | $\sqrt{2}/2$ | 0 | $-\sqrt{2}/2$ |
| t=6/8 | 0 | -1 | 0 | 1 | 0 | -1 | 0 |
| t=7/8 | $\sqrt{2}/2$ | 0 | $-\sqrt{2}/2$ | -1 | $-\sqrt{2}/2$ | 0 | $\sqrt{2}/2$ |

METHOD FOR REDUCING PEAK-TO-AVERAGE POWER RATIO IN AN OFDM TRANSMISSION SYSTEM

CROSS REFERENCE TO RELATED APPLICATIONS

This application is based on and hereby claims priority to European Application No. 06002385 filed on Feb. 6, 2006, the contents of which are hereby incorporated by reference.

BACKGROUND

Described below is a method for reducing Peak-to-Average Power Ratio in an OFDM transmission system.

One of the promising technologies for mobile communications systems beyond 3G (B3G) is multi-carrier modulation based on Orthogonal Frequency Division Multiplex (OFDM). Among other expected features like interactive multimedia services, high capacity, etc., the most crucial seems to be the capability of reaching much higher date rates than it is achievable with current 2G and 3G mobile communications systems. Currently, a considerable number of studies on B3G systems are based on an objective to achieve data rate up to 100 Mbit/s. Assuming typical phenomena of mobile channels like reflections, diffractions and scattering of a propagated radio signal, makes the goal of higher data rates even harder. For single carrier systems data rate of 100 Mbits/s means drastic reduction of symbol duration. If the channel delay spread exceeds the symbol duration then such a system is subject to inter-symbol interference (ISI) caused by a frequency selective fading, and without advanced equalization it is practically unusable.

The basic idea of OFDM is to divide the transmitted bit stream into many different sub-streams and send these over many different sub-channels (sub-carriers). The data rate on each of the sub-channels is much less than the total data rate, and the corresponding sub-channel bandwidth is much less than the total system bandwidth. The number of sub-streams is chosen in a way ensuring that each sub-channel has a bandwidth less than the coherence bandwidth of the channel. Hence, the sub-channels experience relatively flat fading and channel induced ISI on each sub-channel is small.

On the other hand, OFDM can be considered as a technique that transmits data in parallel on a number of equally spaced sinusoidal waveforms which means that the data to be transmitted determine the relative phases of the sinusoids. This results in the main drawback. If the amplitudes of the sinusoids occur at the same time, they add up most constructively producing high peak in resulted signal, greatly exceeding the average level. Since the peak in the signal level defines the peak in the power of the signal, a power amplifier (PA) has to track these peaks in order not to produce distortion. This leads to uneven demands on PA, e.g. it operates most of the time at levels much below its capacity which degrades energy efficiency.

In order to quantify the power peak, the use of the so called Peak-to-Average Power Ratio (PAPR), which is defined in dB as the power peak value relative to the average power of the signal, is made. Such a definition is widely accepted and reasonable also in other systems dealing with high signal peak values.

There is a wide range of methods developed to combat the problem of high PAPR. The most promising methods are based on coding.

The idea of these techniques is to avoid the transmission of symbols that exhibit high PAPR by a properly chosen coding, as described in S. H. Han, J. H. Lee, "An overview of Peak-To-Average Power Ratio Reduction Techniques for Multicarrier Transmission", *IEEE Wireless Communications*, April 2005, pp. 56-65. A common example was originally presented in A. E. Jones, T. A. Wilkinson and S. K. Barton, "Block Coding Scheme for Reduction of Peak to Mean Envelope Power Ratio of Multicarrier Transmission Schemes", *Elect Letters*, Vol. 30, No. 25, December 1994, pp. 2098-2099. It is shown that for the case of BPSK (Binary Phase Shift Keying) modulation and 4 sub-carriers, PAPR in the worst case is 6.02 dB. They noticed that by proper coding (one redundant bit out of four) they would be able to avoid data sequences which exploit high PAPR, resulting in the 3.54 dB PAPR gain. Unfortunately, for a number of sub-carriers greater than 4, they were unable to guarantee the same PAPR gain using simple coding, but were forced to perform an exhaustive search to find the best sequences and make use of look-up tables thereafter. However, such a solution proves infeasible for practical purposes, since length of the look-up table grows rapidly as the number of sub-carriers increases.

Slightly improved approach is to use code words drawn from offsets of a linear code. The code is chosen for its error correction capabilities, whereas the offset is to reduce the PAPR of the resulting signals. Algorithm is easy to implement, but requires extensive calculations to find good codes and offsets, as described in A. E. Jones and T. A. Wilkinson, "Combined Coding for Error Control and Increased Robustness to System Non-linearities in OFDM", *Proc. IEEE VTC '96*, Atlanta, Ga., April-May 1996, pp. 904-908. Even though a computationally efficient geometrical approach to offset selection was proposed in V. Tarokh and H. Jafarkhani, "On the Computation and Reduction of the Peak-to-Average Power Ratio in Multicarrier Communications", *IEEE Trans. Commun.*, Vol. 48, No. 1, January 2000, pp. 37-44, this does not guarantee the PAPR reduction.

Another attractive way is to employ Golay complementary sequences, which provide ideal value of PAPR (no greater than 2 dB), as code words. It has been shown in J. A. Davis and J. Jedwab, "Peak-To-Mean Power Control and Error Correction for OFDM Transmission Using Golay Sequences and Reed-Muller Codes", *Elect. Letters*, Vol. 33, No. 4. February 1997, pp. 267-268; and J. A. Davis and J. Jedwab, "Peak-To-Mean Power Control in OFDM, Golay Complementary Sequences, and Reed-Muller Codes, "*IEEE Trans. Info. Theory*", Vol. 45, No. 7, November 1999, pp. 2397-2417 that large set of binary length $2^m$; m ∈ N Golay complementary pairs can be obtained from the second-order Reed-Muller code. Consequently, it seems possible to combine Reed-Muller block coding (including error control capabilities) along with Golay complementary sequences providing good PAPR. Anyway, this can only be done for the case of MPSK modulation and is again infeasible for large number of sub-carriers due to computations complexity. Moreover, the code rate also decreases with the number of sub-carriers.

Recently, a new method called complement block coding has been proposed in T. Jiang and G. Zhu, "Complement Block Coding for reduction in Peak-to-Average power Ratio of OFDM Signals", *IEEE Comm. Mag.*, September 2005, pp. S17-S22. It uses simple bit inversions of certain bits on predefined positions. It is claimed to obtain interesting PAPR reduction of at most 3.5 dB. In this method, the code rate can be kept constant. Advantageous simplicity of the encoding operation does not, however, guarantee the PAPR gain for any number of sub-carriers. What is more, error correction capabilities of the code are limited to correcting only those bits that had been complemented.

To sum up, all the methods mentioned above do reduce PAPR for the cost of sacrificing other parameters. They introduce a lot of overhead (Reed-Muller code) or do not guarantee PAPR low enough at all. The main disadvantage, however, is that they are impractical for large numbers of sub-carriers due to either high complexity or small PAPR gain.

SUMMARY

Therefore an aspect is to preserve high PAPR reduction while increasing the effective bit rate.

Another aspect is reducing Peak-to-Average Power Ratio in an OFDM transmission system based on a complementary parity coding in which the coding rules are derived from an appropriate auto-correlation property of transmitted symbol sequences.

There is an embodiment of the method for PAPR reduction based on coding. The coding procedure is derived from ideal N/2-shift Aperiodic Auto-Correlation Property and combines features like high PAPR reduction (6.02 dB) independent of number of sub-carriers and low complexity implementation. The used coding relies on complementary parity codes which enable to achieve better performance than common OFDM systems. On the other hand, this solution introduces redundancy of ¼ and thus decreases effective bit rate.

All these abovementioned drawbacks can be compensated by a method which guarantees high PAPR reduction at the expense of introducing some amount of redundancy.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 7 is a graph that shows PAPR CCDF of proposed system for N=32 sub-carriers, FIG. 8 is a graph that depicts PAPR CCDF of proposed system for N=512 sub-carriers and $10^7$ randomly generated frames, FIG. 21 is a block diagram of proposal for OFDM transmitter, FIG. 22 is a block diagram of proposal for OFDM receiver, FIG. 23 is a graph that shows comparison of performance between the reference system and proposed systems with and without error correction in AWGN channel, FIG. 24 is a table depicting evaluation of $$\cos\left(\frac{2\pi}{T}\tau t\right)$$

Figure 1:
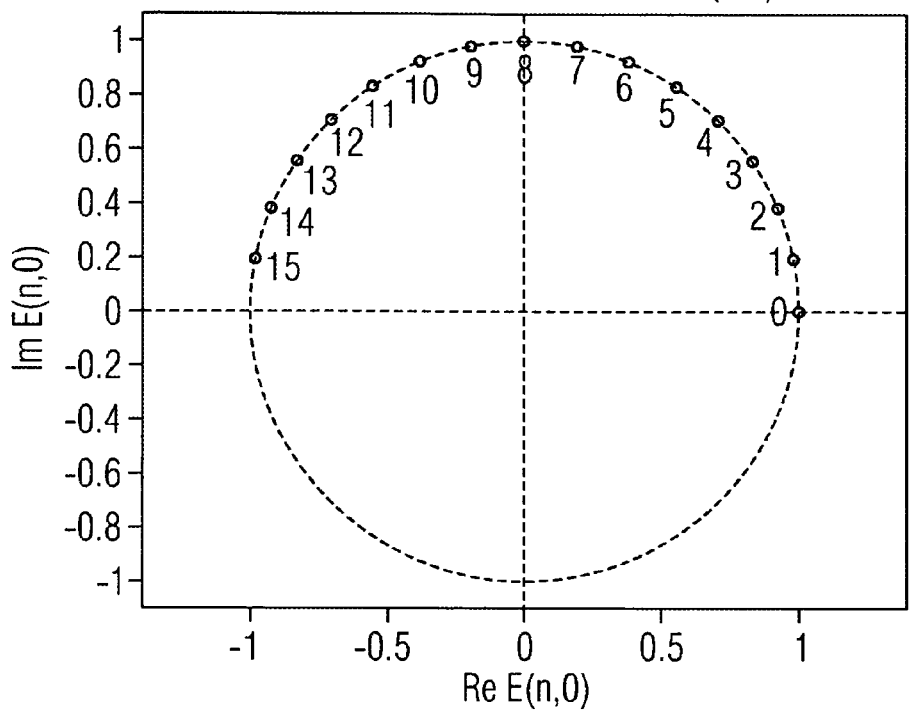
FIG. 1 is a graph that depicts a constellation points for k=0, E(n,0)

sampled at $t \in \langle 0, T \rangle$.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Firstly an introduction and definition of some notation conventions used throughout this specification is given, followed by the detailed analysis and synthesis of the proposed solution.

It is defined by $\bar{a}$ a complex-valued vector of length $N=2^n$; $n \in N$, i.e.

$$\bar{a} = (a_0, a_1, \ldots, a_{N-1}) \quad (1)$$

Then the Aperiodic Auto-Correlation (AAC) function of $\bar{a}$ for the integer shifts $\tau$ is defined by:

$$A(\bar{a}; \tau) = \begin{cases} \sum_{i=0}^{N-1-\tau} a_i a_{i+\tau}^* & 0 \le \tau < N \\ \sum_{i=0}^{N-1+\tau} a_{i-\tau} a_i^* & -N \le \tau < 0 \\ 0 & \text{otherwise} \end{cases} \quad (2)$$

where $a_i^*$ denotes complex conjugate of $a_i$.

An OFDM signal can be considered as the sum of many independent signals modulated onto equally spaced sub-carriers (sub-channels). Therefore, there is a model of a transmitted m-th baseband OFDM signal as the sum of the contributions of all sub-carriers, i.e. the real part of following complex signal $$s^m(t) = Re\left\{\sum_{k=0}^{N-1} a_k^m e^{j2\pi \frac{k}{T} t}\right\}, \quad (3)$$

for $t \in \langle 0, T \rangle$, wherein T stands for the whole symbol duration.

As it was mentioned above, in general, the principal drawback of the multi-carrier modulation schemes is high variation of the signal power envelope. The most common way of defining the instantaneous power of a signal, say r(t), in signal and communications theory is $|r(t)|^2$. A general definition of the main parameter known as Peak-to-Average Power Ratio (PAPR) which expresses fluctuation of the envelope power is:

$$PAPR = \frac{\max|s(t)|^2}{\frac{1}{T}\int_0^T |s(t)|^2 dt}. \quad (4)$$

In some sources also acronyms PAR (Peak-to-Average-power-Ratio) or PMERP (Peak-to-Mean-Envelope-Ratio-Power) are used to express the same. The variation of the signal power can be also described using the power of real part of (3). However, since square of the real part of any complex number is less or equal to its squared absolute value, the upper bound on the envelope power is also an upper bound on the power of the real signal. Moreover, approach based on the envelope enables us to define PAPR by an AAC function which simplifies analysis of the signal envelope power variation.

Further, the instantaneous envelope power of the signal s(t) is defined as follows:

$$P[s^m(t)] = |s^m(t)|^2 = s^m(t)s^m(t)^* \quad (5)$$

Substitution of (3) into (5) leads to:

$$P[s^m(t)] = \sum_{k=0}^{N-1} a_k^m e^{j2\pi\frac{k}{T}t} \sum_{i=0}^{N-1} (a_i^m)^* e^{-j2\pi\frac{i}{T}t} \quad (6)$$

$$= \sum_{k,i} a_k^m (a_i^m)^* e^{j\frac{2\pi}{T}(k-i)t}.$$

Additional manipulation of (6) by substitution $\tau=k-i$ and substitution of (2) at the relevant points gives:

$$P[s^m(t)] = \sum_{k=0}^{N-1} a_k^m (a_k^m)^* + \sum_{k<i} a_k^m (a_i^m)^* e^{j\frac{2\pi}{T}(k-i)t} + \quad (7)$$

$$\sum_{k>i} a_k^m (a_i^m)^* e^{j\frac{2\pi}{T}(k-i)t}$$

$$= A(\bar{a}^m; 0) + \sum_{\tau=1}^{N-1} \sum_{k=0}^{N-1-\tau} a_k^m (a_{k+\tau}^m)^* e^{-j\frac{2\pi}{T}\tau t} +$$

$$\sum_{\tau=-1}^{1-N} \sum_{k=0}^{N-1+\tau} a_{k-\tau}^m (a_k^m)^* e^{-j\frac{2\pi}{T}\tau t}$$

$$= A(\bar{a}^m; 0) + \sum_{\tau=1}^{N-1} A(\bar{a}^m; \tau)e^{-j\frac{2\pi}{T}\tau t} +$$

$$\sum_{\tau=-1}^{1-N} A(\bar{a}^m; \tau)e^{-j\frac{2\pi}{T}\tau t}$$

$$= A(\bar{a}^m; 0) + \sum_{\tau=1}^{N-1} A(\bar{a}^m; \tau)e^{-j\frac{2\pi}{T}\tau t} +$$

$$\sum_{\tau=-1}^{1-N} A(\bar{a}^m; \tau)^* e^{j\frac{2\pi}{T}\tau t}$$

$$= A(\bar{a}^m; 0) + 2Re\left\{\sum_{\tau=1}^{N-1} A(\bar{a}^m; \tau)e^{-j\frac{2\pi}{T}\tau t}\right\}.$$

There is a data sequence $\bar{a}^m$ of the m-th OFDM symbol with entries of BPSK symbols, $a_i \in \{\pm 1\}$, with bit mapping defined by the following rule: $1 \rightarrow +1$ and $0 \rightarrow -1$.

According to (7), the instantaneous envelope power is defined as follows:

$$P[s^m(t)] = N + 2\left\{\sum_{\tau=1}^{N-1} A(\bar{a}^m; \tau)\cos\left(-\frac{2\pi}{T}\tau t\right)\right\} \quad (8)$$

$$= N + 2\left\{\sum_{\tau=1}^{N-1} A(\bar{a}^m; \tau)\cos\left(\frac{2\pi}{T}\tau t\right)\right\}.$$

A first solution to solve the above mentioned problem is:

From (8) follows that in the case data are BPSK modulated, the maximum envelope power of the m-th OFDM symbol is equal to $N^2$ and the mean power is N. Therefore, PAPR according to (4) is 10 log N [dB]. Further, variation of the envelope power and thus resulting PAPR directly depends on the second term of (8), i.e. the sidelobes of AAC of the data sequence to be transmitted. This fact will be used to derive the formula ensuring significant PAPR reduction.

For simplicity, in the following a number of sub-carriers N=8 is assumed, normalized OFDM symbol duration T=1 (without loss of generality). Generalizing for any N will happen later on. AAC for shifts $\tau=0, 1, \ldots, 7$ is to evaluate:

$A(\bar{a};0)=a_0^2+a_1^2+a_2^2+a_3^2+a_4^2+a_5^2+a_6^2+a_7^2=8$ $A(\bar{a};1)=a_0a_1+a_1a_2+a_2a_3+a_3a_4+a_4a_5+a_5a_6+a_6a_7$ $A(\bar{a};2)=a_0a_2+a_1a_3+a_2a_4+a_3a_5+a_4a_6+a_5a_7$ $A(\bar{a};3)=a_0a_3+a_1a_4+a_2a_5+a_3a_6+a_4a_7$ $A(\bar{a};4)=a_0a_4+a_1a_5+a_2a_6+a_3a_7$ $A(\bar{a};5)=a_0a_5+a_1a_6+a_2a_7$ $A(\bar{a};6)=a_0a_6+a_1a_7$ $A(\bar{a};7)=a_0a_7 \quad (9)$ Considering fixed AAC in (8), the instantaneous power envelope depends only on $$\cos\left(\frac{2\pi}{T}\tau t\right).$$

FIG. 24 evaluates this harmonic function for all possible combinations of $\tau$ and discrete time samples at $$t = 0, \frac{1}{8}, \ldots, \frac{7}{8}.$$

It shows that for shift $\tau=4$, cosine function does not return zero for any time t. As a result, AAC value for this shift, $A(\bar{a}; 4)$ contributes the most to the power envelope with alternating positive and negative sign depending on time. Therefore, our aim is to minimize (rather set to zero) $A(\bar{a}; 4)$ by setting explicit conditions on BPSK symbols $a_i$. The AAC for shift $\tau=4$ is given by $$A(\bar{a};4)=a_0a_4+a_1a_5+a_2a_6+a_3a_7 \qquad (10)$$

It is a purpose to make $A(\bar{a}; 4)$ zero by stating 2 conditions $$a_0a_4+a_1a_5=0$$

$$a_2a_6+a_3a_7=0 \qquad (11)$$

With BPSK symbols, division equals multiplication, so it is obtained:

$$a_0 = -\frac{a_1 a_5}{a_4} = -a_1 a_4 a_5 \qquad (12)$$

$$a_2 = -\frac{a_3 a_7}{a_6} = -a_3 a_6 a_7$$

Substituting this to AAC relations of (9), the result is $$A(\bar{a};1)=-a_4a_5-a_1a_3a_6a_7-a_6a_7+a_3a_4+a_4a_5+a_5a_6+a_6a_7$$

$$A(\bar{a};2)=a_1a_3a_4a_5a_6a_7+a_1a_3-a_3a_4a_6a_7+a_3a_5+a_4a_6+a_5a_7$$

$$A(\bar{a};3)=-a_1a_3a_4a_5+a_1a_4-a_3a_5a_6a_7+a_3a_6+a_4a_7$$

$$A(\bar{a};4)=-a_1a_5+a_1a_5-a_3a_7+a_3a_7=0$$

$$A(\bar{a};5)=-a_1a_4+a_1a_6-a_3a_6$$

$$A(\bar{a};6)=-a_1a_4a_5a_6+a_1a_7$$

$$A(\bar{a};7)=-a_1a_4a_5a_7 \qquad (13)$$

According to FIG. 24 the maximum power should occur at time $t=0$, when all the autocorrelation values add up most constructively. Although this is not true for all possible data sequences $\bar{a}=a_0 \ldots a_7$, (since AAC can also be negative) it is sufficient to consider $t=0$, and the worst case occurring when all symbols $a_i=+1$. This is due to the fact that if the maximum power peak occurs at another time, it clearly cannot be greater than in this case, as the sum in rows with t other than $t=0$ in absolute value is always less than in row $t=0$.

Consider first the case without applying relations of (12). Maximum power peak we obtain when each $a_i=+1$, so we evaluate $$P[s^m(0)] = N + 2\left\{\sum_{\tau=1}^{N-1} A(\bar{a}^m; \tau)\right\} \qquad (14)$$

$$= 8 + 2\sum_{\tau=1}^{7}(8-\tau)$$

$$= 8 + 2\sum_{\tau=1}^{7}\tau$$

$$= 8 + 2 \cdot 28 = 64.$$

It can be easily shown that average power is $P_{avg}=8$. This result corresponds with the mentioned well-known fact that power peak for uncoded BPSK modulation is $P_{peak}=N^2$ and average power $P_{avg}=N$. As we know, PAPR is $$PAPR = 10\log_{10}\left(\frac{P_{peak}}{P_{avg}}\right) \qquad (15)$$

$$= 10\log_{10}(N)$$

$$= 10\log_{10}(8)$$

$$= 9.03 \text{ dB}.$$

Evaluating now PAPR for the system applying equations of (12), then for the worst case $a_i=+1$, the result is $$P[s^m(0)] = N + 2\left\{\sum_{\tau=1}^{N-1} A(\bar{a}^m; \tau)\right\} \qquad (16)$$

$$= 8 + 2(1 + 4 + 1 + 0 - 1 + 0 - 1)$$

$$= 16.$$

Since average power is always $P_{avg}=N$, PAPR is $$PAPR = 10\log_{10}\left(\frac{16}{8}\right) = 10\log_{10}(2) = 3.01 \text{ dB}, \qquad (17)$$

which results in 6.02 dB PAPR reduction.

Generalizing for any number of sub-carriers, N is needed. Evaluating AAC is needed first:

$$A(\bar{a}; 0) = N \qquad (18)$$

$$A(\bar{a}; 1) = a_0a_1 + a_1a_2 + \ldots + a_{N-2}a_{N-1}$$

$$A(\bar{a}; 2) = a_0a_2 + a_1a_3 + \ldots + a_{N-3}a_{N-1}$$

$$\ldots$$

$$A\left(\bar{a}; \frac{N}{2}\right) = a_0a_{\frac{N}{2}} + a_1a_{\frac{N}{2}+1} + a_2a_{\frac{N}{2}+2} +$$

$$= a_3a_{\frac{N}{2}+3} + \ldots + a_{\frac{N}{2}-2}a_{\frac{N}{2}+\frac{N}{2}-2} + a_{\frac{N}{2}-1}a_{\frac{N}{2}+\frac{N}{2}-1}$$

$$\ldots$$

$$A(\bar{a}; N-1) = a_0a_{N-1}$$

Further, it is set $$A\left(\bar{a}; \frac{N}{2}\right)$$

to zero by setting:

$$a_0 = -a_1 a_{\frac{N}{2}} a_{\frac{N}{2}+1} \qquad (19)$$

$$a_2 = -a_3 a_{\frac{N}{2}+2} a_{\frac{N}{2}+3}$$

$$\ldots$$

$$a_{\frac{N}{2}-2} = -a_{\frac{N}{2}-1} a_{\frac{N}{2}+\frac{N}{2}-2} a_{\frac{N}{2}+\frac{N}{2}-1}$$

The condition of $$A(\bar{a}; \frac{N}{2}) = 0$$

means that AAC sampled at $$\tau = -\frac{N}{2}, 0, \frac{N}{2}$$

gives δ function, i.e. ideal AAC function, whereby $$\delta(\tau) = \begin{cases} N & \tau = 0 \\ 0 & \tau \neq 0. \end{cases}$$

Constructing the equations for AAC similar to those of (13) is not needed. Rather calculating is necessary how many negative signs would occur in them. For the worst case ($a_i=+1$), a total number of negative symbols $$a_0, a_2, \ldots, a_{\frac{N}{2}-2}$$

will be $$\frac{\frac{N}{2}-2}{2} + 1 = \frac{N}{4}.$$

Thus, $$\frac{3N}{4}$$

symbols will be positive. It is now clear that writing the equations for AAC, there would have been $$\frac{N}{4} \times \frac{3N}{4} = \frac{3N^2}{16}$$

negative signs. The total number of terms in those equations is simply the sum of an arithmetic sequence $$1 + 2 + \ldots + (N-1) = \frac{N(N-1)}{2}.$$

As known, $$\frac{3N^2}{16}$$

of those terms are negative, which means $$\frac{N(N-1)}{2} - \frac{3N^2}{16} = \frac{5N^2 - 8N}{16}$$

are positive. Thus, the difference between the number of positive and negative signs is $$\frac{5N^2 - 8N}{16} - \frac{3N^2}{16} = \frac{N^2 - 4N}{8},$$

which is the result of the sum in (8) obtaining for the worst case. So, the power peak is $$P_{peak} = N + 2\left(\frac{N^2 - 4N}{8}\right) = \frac{N^2}{4} \tag{20}$$

Hence, if it is set $$A(\bar{a}; \frac{N}{2}) = 0,$$

PAPR in the worst case is $$10\log_{10}\left(\frac{\frac{N^2}{4}}{N}\right) = 10\log_{10}\left(\frac{N}{4}\right). \tag{21}$$

If it is not applied conditions (19), PAPR is $10\log_{10}(N)$. Consequently, the amount of PAPR reduction is always $$10\log_{10}(N) - 10\log_{10}\left(\frac{N}{4}\right) = 10\log_{10}(4) = 6.02 \text{ dB}, \tag{22}$$

independent of number of sub-carriers, N. Verifying this result by simulations is useful.

The condition of (19) is to be considered and how they can be transformed back to the bit basis is to see. Generally, it is set the condition $$a_i = -a_{i+1} a_{\frac{N}{2}+i} a_{\frac{N}{2}+i+1}. \tag{23}$$

with $i = 0, 2, \ldots, \frac{N}{2} - 2$. It is written $$a_i = -a_j a_k a_l \tag{24}$$

for brevity. For the BPSK symbols, only negative symbols $a_j$, $a_k$, $a_l$ do cause a change in the sign of $a_i$. Therefore, it is clear that if the number of $\{+1\}$ symbols out of $a_j$, $a_k$, $a_l$ is even (0 or 2), then $a_i=+1$, and $a_i=-1$ otherwise. Putting this to the bit level, the following result is got. If the number of ones out of three bits $b_j$, $b_k$, $b_l$ (corresponding to symbols $a_j$, $a_k$, $a_l$) is even, the resulted bit $b_i$ is a one, and if the number of ones is odd, the resulted bit $b_i$ is a zero. This is the formula of the complementary parity code, which may be defined by $$b_i = b_j \oplus b_k \oplus b_l \oplus 1, \tag{25}$$

where ⊕ denotes the operation sum modulo 2 (XOR). The term "parity" expresses parity encoding operation while term "complementary" is used to express negation of the result.

Having found the encoding operation of (25) enables to perform coding before applying BPSK modulation, guaranteeing that relations of (19) will hold.

A further solution to solve the above mentioned problem is:

There is a further assumption of normalized symbol duration, i.e. T=1. The term on right hand side of (8) can be written as follows:

$$\sum_{\tau=1}^{N-1} A(\bar{a}^m; \tau)\cos(2\pi\tau t) = \quad (26)$$

$$A(\bar{a}^m; 1)\cos(2\pi t) + A(\bar{a}^m; 2)\cos(2\pi 2t) + \ldots +$$
$$A(\bar{a}^m; N-2)\cos(2\pi(N-2)t) + A(\bar{a}^m; N-1)\cos(2\pi(N-1)t).$$

Since $\cos(2\pi kt)=\cos(2\pi(N-k)t)$ for $k=\langle N/2+1, N-1\rangle$, (26) can be rewritten as $$\sum_{\tau=1}^{N-1} A(\bar{a}^m; \tau)\cos(2\pi\tau t) = \cos(2\pi t)[A(\bar{a}^m; 1) + A(\bar{a}^m; N-1)] + \ldots ++ \quad (27)$$

$$\cos\left(2\pi\left(\frac{N}{2}-1\right)t\right)\left[A\left(\bar{a}^m; \frac{N}{2}-1\right) + A\left(\bar{a}^m; \frac{N}{2}+1\right)\right] ++$$

$$\cos\left(2\pi\frac{N}{2}t\right)A\left(\bar{a}^m; \frac{N}{2}\right).$$

As an example, let N=16. Evaluation of (27) gives:

$$\sum_{\tau=1}^{15} A(\bar{a}^m; \tau)\cos(2\pi\tau t) = \cos(2\pi t)[A(\bar{a}^m; 1) + A(\bar{a}^m; 15)] + \quad (28)$$

$$\cos(2\pi 2t)[A(\bar{a}^m; 2) + A(\bar{a}^m; 14)] ++$$
$$\cos(2\pi 3t)[A(\bar{a}^m; 3) + A(\bar{a}^m; 13)] +$$
$$\cos(2\pi 4t)[A(\bar{a}^m; 4) + A(\bar{a}^m; 12)] ++$$
$$\cos(2\pi 5t)[A(\bar{a}^m; 5) + A(\bar{a}^m; 11)] +$$
$$\cos(2\pi 6t)[A(\bar{a}^m; 6) + A(\bar{a}^m; 10)] ++$$
$$\cos(2\pi 7t)[A(\bar{a}^m; 7) + A(\bar{a}^m; 9)] + \cos(2\pi 8t)A(\bar{a}^m; 8).$$

For notational convenience $A(\bar{a}^m; \tau) = A(\tau)$ is further used. By applying recursive formula $\cos nx = 2 \cos[(n-1)x]\cos x - \cos[(n-2)x]$ and substitution $2\pi t = x$, and $n=1,\ldots 8$ in (28) it is got:

$$\sum_{\tau=1}^{15} A(\tau)\cos(x\tau) = 128A(8)\cos^8(x) + \quad (29)$$

$$[64 A(9) + 64A(7)]\cos^7(x) ++[32A(6) + 32A(10) - 256A(8)]$$
$$\cos^6(x) + [16A(5) + 16A(11) - 112A(7) - 112A(9)]$$
$$\cos^5(x) ++[-48A(6) - 48A(10) + 8A(4) + 8A(12) + 160A(8)]$$
$$\cos^4 x ++[-20A(5) + 4A(13) + 4A(3) + 56A(7) -$$
$$20A(11) + 56A(9)]\cos^3 x ++[2A(2) + 18A(10) +$$
$$2A(14) + 18A(6) - 32A(8) - 8A(4) - 8A(12)]\cos^2$$
$$x ++[A(1) + A(15) - 7A(7) - 3A(3) - 3A(13) +$$

-continued
$$5A(5) + 5A(11) - 7A(9)]\cos x ++A(8) -$$
$$A(14) + A(4) + A(12) - A(6) - A(10) - A(2).$$

As can be seen for absolute term, $\cos^0 x$ of (29), there are only three shifts of AAC with sign "+", i.e. A(8) A(4) and A(12). Furthermore, the shift A(8) is multiplied in each term by the highest coefficient. This causes fluctuation of the envelope power. Therefore, in order to lower the fluctuation it would be necessary to minimize A(8).

It is expressed AAC for shift $\tau=8$:

$$A(8)=a_0a_8+a_1a_9+a_2a_{10}+a_3a_{11}+a_4a_{12}+a_5a_{13}+a_6a_{14}+a_7a_{15} \quad (30)$$

A(8) is not set to zero as it was suggested in the first solution, but it is minimized in another way. The conditions are presented in the first solution for three symbols $a_2$, $a_4$, $a_6$. But, the condition is altered for the first symbol, $a_0$:

$$a_0 = \frac{a_1 a_9}{a_8} = +a_1 a_8 a_9 \quad (31)$$

$$a_2 = -\frac{a_3 a_{11}}{a_{10}} = -a_3 a_{10} a_{11}$$

$$a_4 = -\frac{a_5 a_{13}}{a_{12}} = -a_5 a_{12} a_{13}$$

$$a_6 = -\frac{a_7 a_{15}}{a_{14}} = -a_7 a_{14} a_{15}$$

This means that A(8) will no longer be equal to zero, rather $A(8)=2a_0a_8$.

Calculating PAPR exactly the same way as it was done in the first solution. Following this argument, it can be shown that the difference between positive and negative signs in equations for AAC would be 42. This results in power peak $P_{peak}=16+2(42)=100$.

Hence, PAPR in the worst case is:

$$PAPR = 10\log_{10}\left(\frac{P_{peak}}{P_{avg}}\right) \quad (32)$$
$$= 10\log_{10}\left(\frac{100}{16}\right)$$
$$= 10\log_{10}(6.25)$$
$$= 7.96 \text{ dB,}$$

and the amount of PAPR reduction $$10 \log_{10}(16) - PAPR = 12.04 - 7.96 = 4.08 \text{ dB.} \quad (33)$$

This result will be verified by simulations. Of course, since A(8) is not set to zero, PAPR reduction is less than 6.02 dB presented in the first solution. However, there is another advantage of the proposed system.

First of all, it is clear that the proposed conditions of (31) are not the only ones that guarantee 7.96 dB PAPR. For instance, the condition is altered for $a_2$ instead of $a_0$, which would lead to $a_2=+a_3a_{10}a_{11}$. There are 4 possibilities of choosing the symbol to alter the condition for. In each of these cases, there will be 3 negative signs and 1 positive sign in the resulted conditions, similar to (31). Further, each case guarantees 4.08 dB PAPR reduction. Position of sign "+" determines four possibilities which are mutually exclusive, i.e. choosing one position only the conditions stated for this case hold. The following formulae define four mutually exclusive possibilities preserving PAPR reduction of 4.08 dB:

$$a_0 = \frac{a_1 a_9}{a_8} = +a_1 a_8 a_9; \quad a_2 = -\frac{a_3 a_{11}}{a_{10}} = -a_3 a_{10} a_{11} \quad \text{(I)}$$
$$a_4 = -\frac{a_5 a_{13}}{a_{12}} = -a_5 a_{12} a_{13}; \quad a_6 = -\frac{a_7 a_{15}}{a_{14}} = -a_7 a_{14} a_{15}$$

$$a_0 = -\frac{a_1 a_9}{a_8} = -a_1 a_8 a_9; \quad a_2 = \frac{a_3 a_{11}}{a_{10}} = +a_3 a_{10} a_{11} \quad \text{(II)}$$
$$a_4 = -\frac{a_5 a_{13}}{a_{12}} = -a_5 a_{12} a_{13}; \quad a_6 = -\frac{a_7 a_{15}}{a_{14}} = -a_7 a_{14} a_{15}$$

$$a_0 = -\frac{a_1 a_9}{a_8} = -a_1 a_8 a_9; \quad a_2 = -\frac{a_3 a_{11}}{a_{10}} = -a_3 a_{10} a_{11} \quad \text{(III)}$$
$$a_4 = \frac{a_5 a_{13}}{a_{12}} = +a_5 a_{12} a_{13}; \quad a_6 = -\frac{a_7 a_{15}}{a_{14}} = -a_7 a_{14} a_{15}$$

$$a_0 = -\frac{a_1 a_9}{a_8} = -a_1 a_8 a_9; \quad a_2 = -\frac{a_3 a_{11}}{a_{10}} = -a_3 a_{10} a_{11} \quad \text{(IV)}$$
$$a_4 = -\frac{a_5 a_{13}}{a_{12}} = -a_5 a_{12} a_{13}; \quad a_6 = \frac{a_7 a_{15}}{a_{14}} = +a_7 a_{14} a_{15}$$

These 4 possible sets in radix-2 form are numbered according to the following rule:

$$\text{(I)} \rightarrow 00; \text{(II)} \rightarrow 10; \text{(III)} \rightarrow 11; \text{(IV)} \rightarrow 01. \quad (34)$$

This suggests the idea for position modulation which can modulate further information in the position of the sign "+". Such a unique modulation technique is named as Sign Position Modulation (SPM).

Apart from 12 information bits carried directly in the frame, receiver will determine which of the 4 possible sets of conditions hold and generate 2 further information bits.

The code rate for such a system is evaluated. There are 12 information bits and 4 redundant bits inserted by one set of conditions, e.g. that of (31). This results in 16 bits being transmitted. Further 2 bits are carried by the applied conditions, so 14 information bits are transmitted. Hence the code rate is $$R = \frac{14}{16} = 0.875.$$

This is a significant increase in code rate, compared to the reference of $$R = \frac{12}{16} = 0.75.$$

Now, there is the rule for encoding procedure of BPSK symbols given in (I) and an analysis of the rules for bits corresponding to these symbols. The first equation which defines redundant symbol $a_0$ can be mapped to the bit level by common parity code, i.e.

$$b_0 = b_1 \oplus b_8 \oplus b_9 \quad (35)$$

where $\oplus$ denotes the operation sum modulo 2. Similarly, relation at the bit level also for $b_2$, $b_4$ and $b_6$ in (II), (III) and (IV), respectively is defined.

The remaining symbols $a_2$, $a_4$ and $a_6$ in (I) meet, at the bit level, the rule for complementary parity code, i.e.

$$b_2 = b_3 \oplus b_{10} \oplus b_{11} \oplus 1$$

$$b_4 = b_5 \oplus b_{12} \oplus b_{13} \oplus 1$$

$$b_6 = b_7 \oplus b_{14} \oplus b_{15} \oplus 1 \quad (36)$$

In the same way it is possible to define relations, at the bit level, for other symbols in (II), (III) and (IV). This feature enables for exploiting parity relation between the bits for error correction.

The system with larger number of sub-carriers, e.g. 32 is taken into consideration. In such a case, there would be 8 possibilities of altering the conditions presented in the first solution, which means that further 3 bits could be transferred by taking one possibility. So, 24+3=27 information bits would be transferred, resulting in the code rate $$R = \frac{27}{32} = 0.844.$$

It is now clear that increasing the number of sub-carriers would lead to decreased code rate. Therefore it is proposed to use the system with 16 sub-carriers.

In real systems, larger number of sub-carriers is usually used, so separately coded blocks of length 16 may be combined to produce larger sizes. For instance, system with 64 sub-carriers would employ 4 blocks of individually coded data. Since we guarantee PAPR reduction of 4.08 dB only for 16 sub-carriers, a key question now is, how large will be the PAPR reduction if we combine individual blocks of length 16, followed by IFFT to produce OFDM symbol.

l should be a positive integer and $N=2^l$. $f_1$ and $f_2$ should be 2 complex-valued sequences of length N and $f=(f_1, f_2)$ be the combined sequence of length $2N=2^{l+1}$. Then, the 2N-point Inverse Fast Fourier Transform (IFFT) of the sequence f, $IFFT_{2N}(f)$, may be computed by the well-known decimation in frequency algorithm, which calculates the even and odd components (samples) of the resulted time domain signal separately. Even components are given by the formula:

$$(IFFT_{2N}\{f\})_{2n} = \left(\frac{IFFT_N\{f_1\} + IFFT_N\{f_2\}}{2}\right)_n \quad (37)$$

where N-point IFFT of the subsequent spectra $f_1$, $f_2$ is used and n=0, 1, . . . , N−1 denotes the n-th component of the resulted signal. Odd components are given by:

$$(IFFT_{2N}\{f\})_{2n+1} = \left(\frac{IFFT_N\{f_1 \cdot e^{j\frac{\pi}{N}n}\} - IFFT_N\{f_2 \cdot e^{j\frac{\pi}{N}n}\}}{2}\right)_n, \quad (38)$$

where the n-th components of the spectra $f_1$, $f_2$ are pre-multiplied by $$e^{j\frac{\pi}{N}n}$$

before applying IFFT.

Since peak in power is determined by the peak of the absolute value of the time domain signal, the purpose is to find the resulting component after IFFT with maximum absolute value.

The case when two sequences (blocks) $f_1$, $f_2$ of length N=16 are combined to produce the sequence f of length 2N=32. Performing IFFT of the combined sequence yields time domain signal (transformed sequence) $F=IFFT_{2N}\{f\}$. The maximum absolute values of the even and odd components of F separately is considered.

$f_i$ should be the sequence (after encoding operation) of length N which results in maximum possible peak of the absolute value, i.e. max $\{|IFFT_N\{f_i\}|\} \geq$ max $\{|IFFT_N\{f_k\}|\}$ for all possible encoded sequences $f_k$. It has to be stressed at this point that more than one such sequence $f_i$ may exist. However, it is straightforward from (37) that maximum absolute value of even components will occur when $f_1=f_i$ and $f_2=f_i$, i.e. the two combined blocks are represented by the same sequence. In this case, the right-hand side of (37) is $$\frac{IFFT\{f_i\} + IFFT\{f_i\}}{2} = IFFT\{f_i\},$$

so the peak of the transformed combined sequence f at even components, max $\{|(IFFT_{2N}\{f\})_{2k}|\}$ is the same as that of sequence $f_i$, max $\{|IFFT_N\{f_i\}|\}$. Anyway, power peak remains the same, but the average power of F (length 32) is half the average power of any sequence of length 16. This means that PAPR in linear scale doubles, or increases by 3.01 dB compared to the system with 16 sub-carriers. However, PAPR of the reference OFDM system without coding also doubles from N to 2N, or increases by 3.01 dB, so the amount of PAPR reduction remains the same, 4.08 dB.

The maximum of odd components is now considered. $f_i$ should be the encoded sequence of length N that results in the maximum possible peak of absolute value of the transformed pre-multiplied sequence $$(f_i \cdot e^{j\frac{\pi}{N}n}),$$

i.e.

$$\max\{|IFFT\{f_i \cdot e^{j\frac{\pi}{N}n}\}|\} \geq \max\{|IFFT\{f_k \cdot e^{j\frac{\pi}{N}n}\}|\} \quad (39)$$

holds for any encoded sequence $f_k$. Again, more than one such a sequence $f_i$ may exist. It follows from (38) that maximum of odd components will occur when $f_1=f_i$ and $f_2=-f_i$, i.e. the second sequence is equal the first one multiplied by −1. In such a case, right-hand side of (38) is $$RHS(21) = \frac{IFFT_N\{f_i \cdot e^{j\frac{\pi}{N}n}\} - IFFT_N\{(-f_i) \cdot e^{j\frac{\pi}{N}n}\}}{2} \quad (40)$$

$$= \frac{IFFT_N\{f_i \cdot e^{j\frac{\pi}{N}n}\} + IFFT_N\{f_i \cdot e^{j\frac{\pi}{N}n}\}}{2}$$

$$= IFFT_N\{f_i \cdot e^{j\frac{\pi}{N}n}\}$$

Therefore, it is enough to calculate the maximum possible peak of the transformed pre-multiplied sequence, $$\max\{|IFFT\{f_i \cdot e^{j\frac{\pi}{N}n}\}|\}.$$

Evaluating this absolute value for N=16 gives $$|F(k)| = |IFFT\{f_i \cdot e^{j\frac{\pi}{16}n}\}| \quad (41)$$

$$= \left|\sum_{n=0}^{15} f_i(n) e^{j\frac{\pi}{16}n} e^{j\frac{2\pi}{16}nk}\right|$$

$$= \left|\sum_{n=0}^{15} f_i(n) e^{j\frac{\pi}{16}n(2k+1)}\right|$$

Which can be further expressed as $$|F(k)| = \left|\sum_{n=0}^{15} f_i(n)\left[\cos\left(\frac{\pi}{16}n(2k+1)\right) + j\sin\left(\frac{\pi}{16}n(2k+1)\right)\right]\right| = \quad (42)$$

$$= \left|\sum_{n=0}^{15} f_i(n)\cos\left(\frac{\pi}{16}n(2k+1)\right) + j\sum_{n=0}^{15} f_i(n)\sin\left(\frac{\pi}{16}n(2k+1)\right)\right| =$$

$$= \sqrt{\left(\sum_{n=0}^{15} f_i(n)\cos\left(\frac{\pi}{16}n(2k+1)\right)\right)^2 + \left(\sum_{n=0}^{15} f_i(n)\sin\left(\frac{\pi}{16}n(2k+1)\right)\right)^2}.$$

The purpose is to find the global maximum of absolute values |F(k)| of (41) for all possible encoded sequences $f_i$ and k=0, 1, . . . , 15. It is clear from (41) that absolute value of sum of complex numbers has to be examined that form a constellation on the unit circle. FIG. 1 shows the constellation of the points $$E(n, k) = e^{j\frac{\pi}{16}n(2k+1)}$$

for k=0, n=0, 1, . . . , 15. The quadrants of the complex plain by angles is defined $$Q_1 = \left\langle 0, \frac{\pi}{2}\right\rangle, \quad Q_2 = \left\langle \frac{\pi}{2}, \pi\right\rangle, \quad Q_3 = \left\langle \pi, \frac{3\pi}{2}\right\rangle, \quad Q_4 = \left(\frac{3\pi}{2}, 2\pi\right) \quad (43)$$

Figure 2:
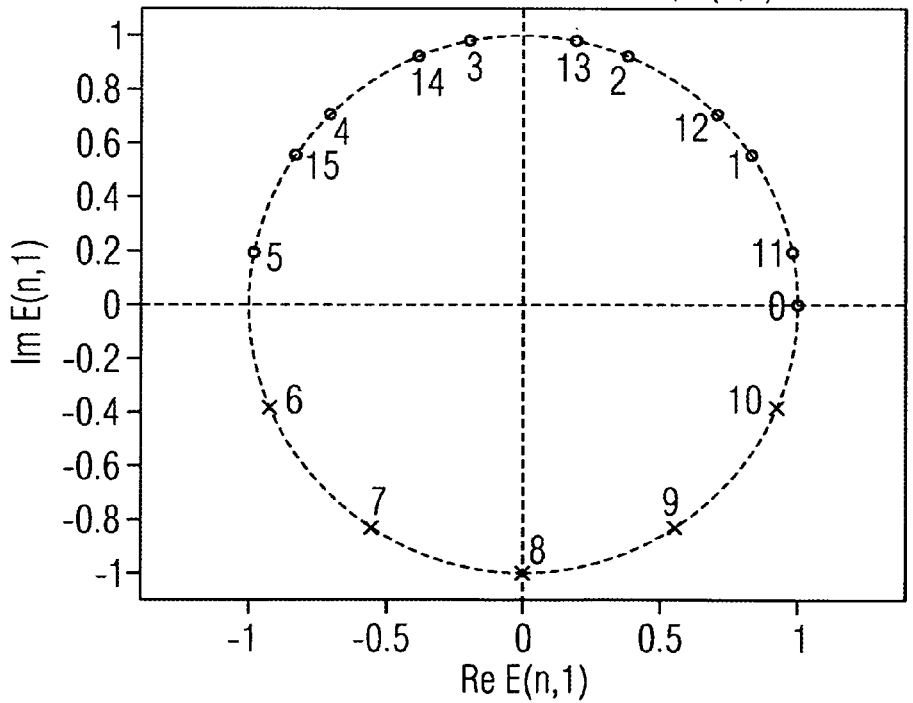
FIG. 2 is a graph that depicts a constellation points for k=1, E(n,1)

FIG. 2 shows the constellation points for k=1 Consider now multiplying of these constellation points by BPSK modulated sequence $f_i(n) \in \{-1, 1\}$. If the given point is multiplied by $f_i(n)=1$, its position on the unit circle remains the same, whereas multiplying by $f_i(n)=-1$ moves the point from $Q_1$ to $Q_3$ and vice versa or from $Q_2$ to $Q_4$ and vice versa. Anyway, the absolute value remains unchanged when multiplying by 1 or −1. Therefore, it is apparent that multiplication by +1 and −1 will map all constellation points to unit circle.

Figure 3:
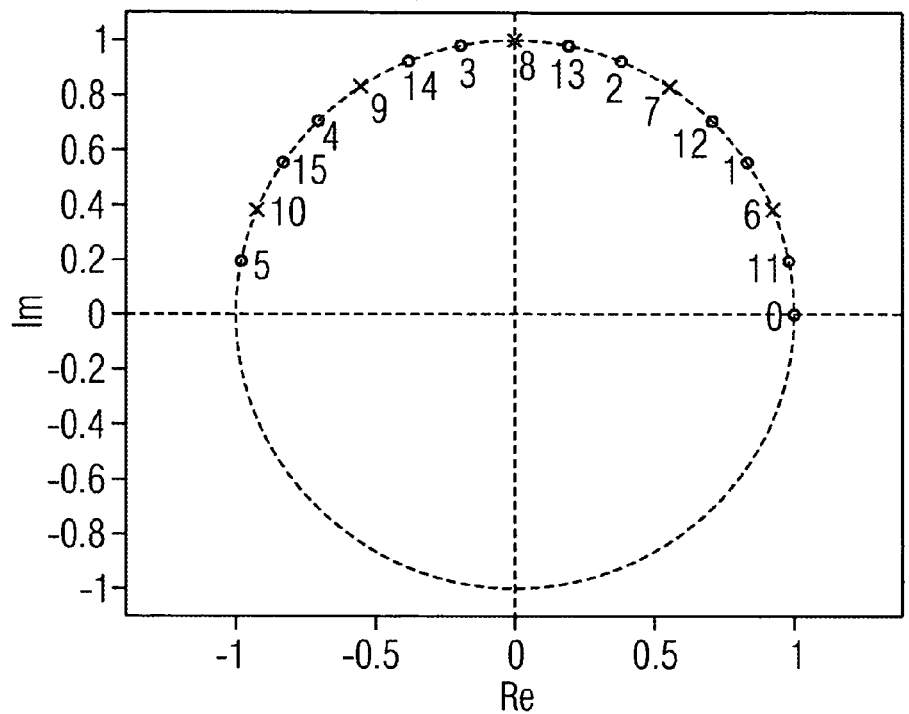
FIG. 3 is a graph that shows a resulting constellation for k=1.
Figure 4:
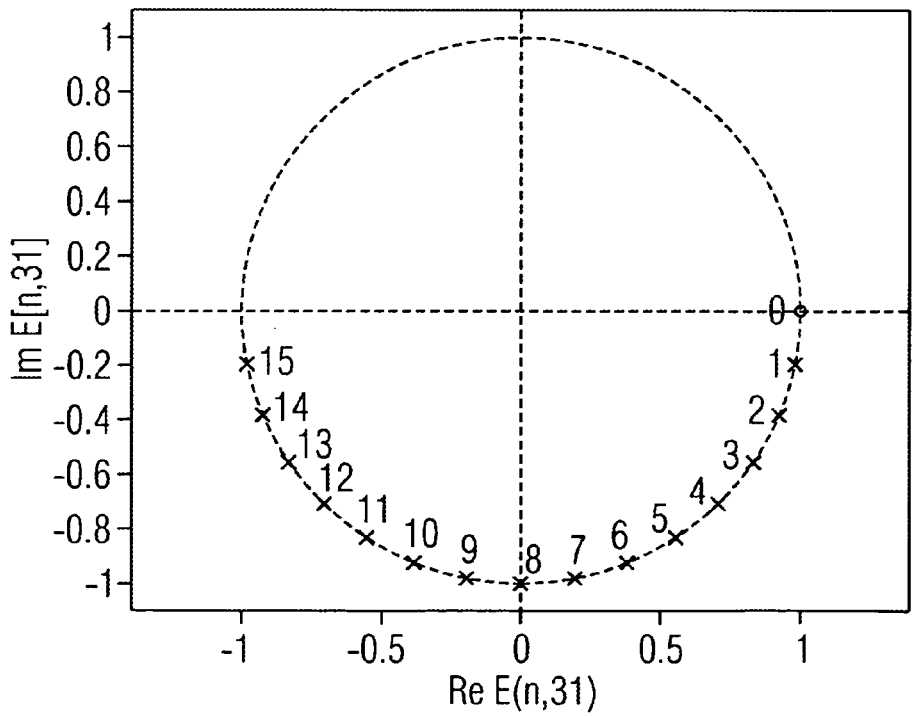
FIG. 4 is a graph that depicts a constellation points for k=31, E(n,31)
Figure 5:
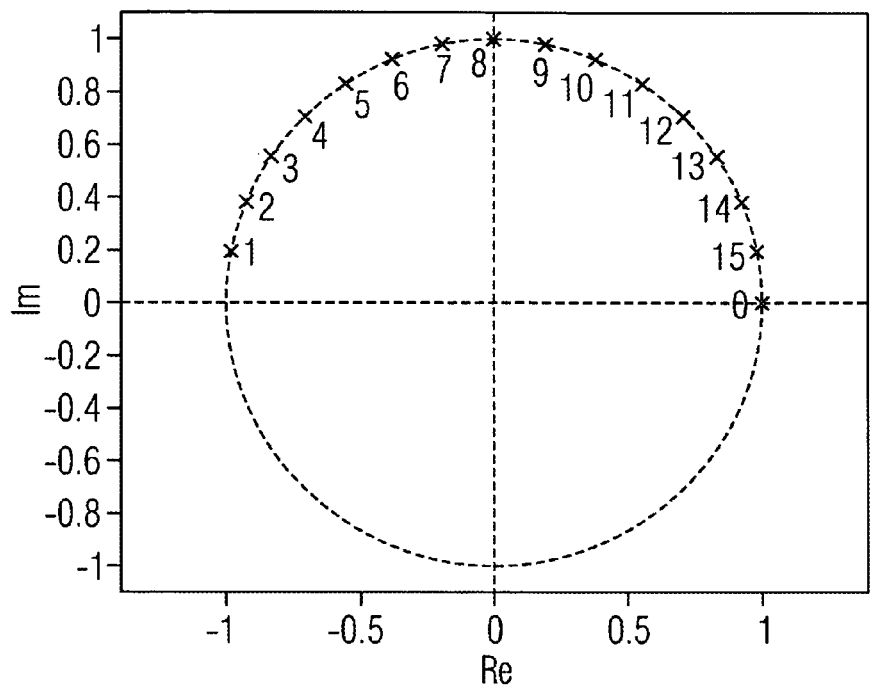
FIG. 5 is a graph that shows a resulting constellation for k=31.

The maximum of |F(k)| for k=0 is observed. It is easy to check that the maximum can be achieved when all constellation points are multiplied by all-ones sequence. However, due to encoding procedure this case cannot occur. Anyway, we can use this approach to find the maximum of |F(k)| for k≠0 which cannot exceed the maximum for k=0. In contrast to the case when k=0, the deployment of the constellation points for $k \neq 0$ multiplied by the encoded sequence $f_i$ can reach the maximum of $|F(k)|$. In order to evaluate the maximum for $k \neq 0$ it is sufficient to show that under specific conditions, mapping of the constellation points for $k \neq 0$ becomes the same as in the worst case for $k=0$ (except for the order of the points on unit circle). This can be done by simple multiplication of each constellation point in the quadrants $Q_3$ and $Q_4$ by $-1$. FIG. 3 illustrates the resulting constellation for $k=1$. One can check that the positions of the points on the unit circle are the same as for the case when $k=0$. FIGS. 4 and 5 show the constellation points for $k=31$ before and after multiplication by $-1$, respectively. Transforming the constellation to the same case is possible. It is important to show that this concept guarantees a unique position of each constellation point in quadrants $Q_1$ and $Q_2$ after the multiplication. This means that $Q_1$ and $Q_2$ will contain all the points, i.e.

$$e^{j\frac{\pi}{16}n}, n = 0, 1, \ldots, 15.$$

Proof is made by a contradiction. There is an assumption that for a given k a case when any two different points appear in $Q_1$ and $Q_2$ at the same position could happen, i.e. there exist two points, say $n_i$ and $n_j$; $n_i \neq n_j$ and $0 \leq n_i, n_j \leq 15$, for which the following holds:

$$\frac{\pi}{16}n_i(2k+1) \equiv \frac{\pi}{16}n_j(2k+1)(\bmod \pi). \quad (44)$$

By manipulating of (44), the result is $$n_i(2k+1) \equiv n_j(2k+1)(\bmod 16) \quad (45)$$

which can be further expressed by $$n_i \equiv n_j\left(\bmod \frac{16}{\gcd(2k+1, 16)}\right) \quad (46)$$

Because $\gcd(2k+1,16)=1$, from (46) it follows that $n_i = n_j$, which is in contradiction with the assumption. Note that $\gcd(2k+1, N)=1$ holds only if N can be expressed as integer powers of two, i.e. $N=2^l; l \in N$.

The fact that deployment of the constellation points for $k \neq 0$ can be transformed to the deployment of $k=0$, allows for evaluation of the maxima which correspond to the maximum of the deployment when $k=0$, i.e.:

$$\max\{|IFFT\{f_i e^{j\frac{\pi}{16}n}\}|\} = \max\{|IFFT\{e^{j\frac{\pi}{16}n}\}|\} \doteq 0.63764 \quad (47)$$

This gives the following PAPR:

$$PAPR = 10\log_{10}\left(\frac{P_{peak}}{P_{avg}}\right) \quad (48)$$

$$= 10\log_{10}\left(\frac{0.63764^2}{0.03125}\right)$$

$$= 10\log_{10}(13.01071)$$

$$\doteq 11.14301 \text{ dB}.$$

Compared to the maximal PAPR, the proposed solution results in the gain of $$10\log_{10}(32)-PAPR=15.05150-11.14301=3.90850 \text{ dB}. \quad (49)$$

Notice that (49) evaluates gain in PAPR reduction for odd bins. As it was shown above, PAPR reduction on even bins is different and therefore, the total gain has to be evaluated as a minimum of the gains corresponding to even and odd bins, respectively. In our case, it is min(4.08,3.91)=3.91 dB.

As a generalization for $N=2^l$, maximum of $|F(k)|$ for odd bins is $$\max\{|IFFT\{f_i e^{j\frac{\pi}{N}n}\}|\} \leq \max\{|IFFT\{e^{j\frac{\pi}{N}n}\}|\}, \quad (50)$$

where $n=0, 1, \ldots, N-1$. The sign "$\leq$" in (50) is used to express that encoded sequence $f_i$ cannot exceed the maximum determined by the all-ones sequence.

Figure 9:
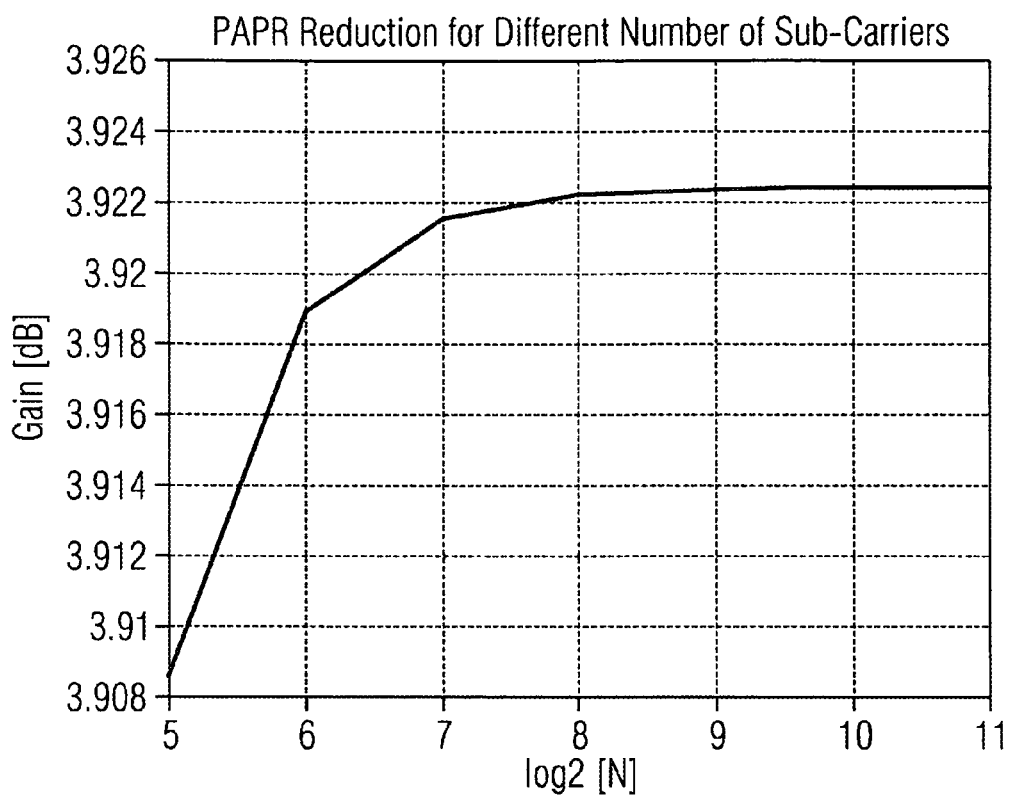
FIG. 9 is a graph that depicts PAPR reduction for different numbers of sub-carriers.

It is mentioned that efficiency of the encoding procedure defined by (I), (II), (III) or (IV) due to increasing redundancy degrades with increasing number of sub-carriers (FFT size). Therefore, it is proposed for higher number of sub-carriers to use the so called block approach (block of 16 sub-carriers is used as a basis to form higher number of sub-carriers). Comparison between PAPR reduction gain for block of 16 and 32 sub-carriers shows that block approach slightly decreases the gain. Therefore, one can expect that for higher number of sub-carriers, e.g. 512 or 1024, the PAPR reduction gain would significantly degrade. Surprisingly, numerical experiments according to (47) have shown that this does not happen. FIG. 9 shows that the block approach negligibly improves the gain with increasing number of sub-carriers. The most important result is that the assumption for decreasing gain derived from experiments with 32 sub-carriers is not valid. Hence, example of 32 sub-carriers can be considered as a worst case from PAPR reduction point of view.

A novel concept of PAPR reduction designated for the OFDM system with BPSK modulation is proposed. The core of the concept relies on introducing the redundancy of N/4 bits after the encoding procedure. This redundancy lowers spectral efficiency (increases the bandwidth required). Since it is well-known that spectral efficiency of multi-carrier modulation schemes is higher than that of single-carrier ones, the decreased spectral efficiency of OFDM system due to inserted redundancy is still higher compared to a single carrier modulation (the same is considered in A. E. Jones, T. A. Wilkinson and S. K. Barton for the same amount of redundancy). In despite of the fact that BPSK modulation does not provide high data rates, there are applications that do not require very high data rates, however the most crucial point is to ensure low PAPR, e.g. uplink data transmissions.

The proposal is suitable for the systems of this kind. Furthermore, it has to be stressed that the principle presented in the proposal is not strictly restricted to BPSK modulation, but is also applicable with QPSK (Quadrature Phase Shift Keying) and other coherent modulations. It is considered, e.g. QPSK modulation, as two mutually orthogonal BPSK modulations. Therefore, it is natural that PAPR reduction will be smaller than in case of one BPSK modulation.

There are several advantages gained by the proposed scheme. It is to point out the most significant ones.

Constant PAPR reduction. In the previous section it is proved that the amount of PAPR reduction does not change with the number of sub-carriers. This is a very important characteristic, which methods described previously definitely lack. Practical applications use large numbers of sub-carriers, typically 128 to 512, or even higher. The techniques for PAPR reduction, known in the art, have not proved or shown ability to guarantee required level of PAPR for high numbers of sub-carriers.

Figure 17:
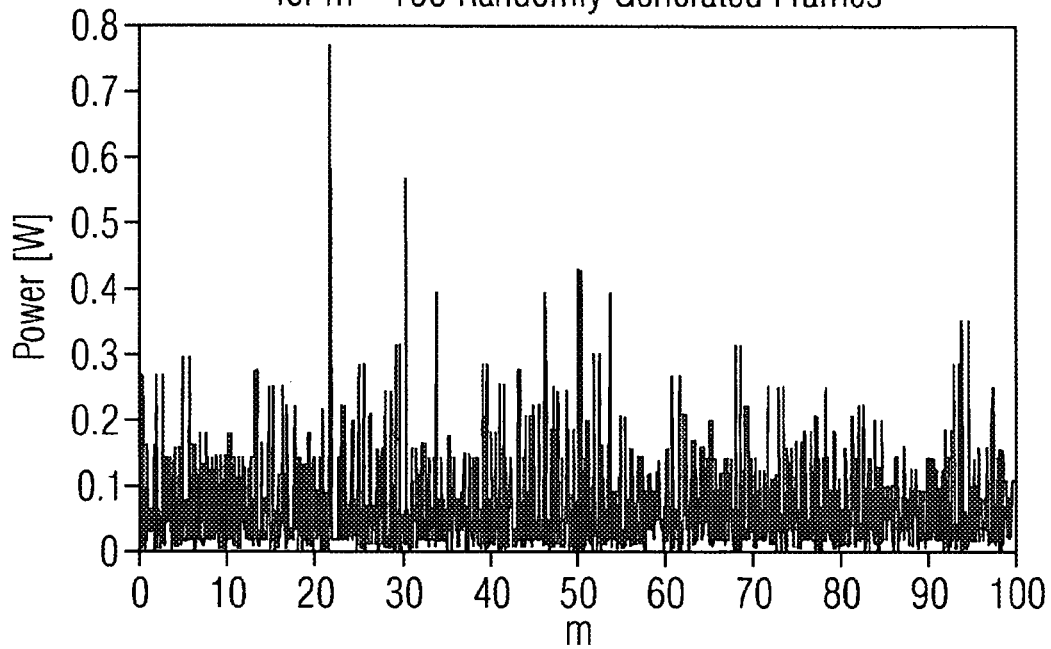
FIG. 17 is a graph that shows a power envelope of common OFDM system for m=100 randomly generated frames.
Figure 18:
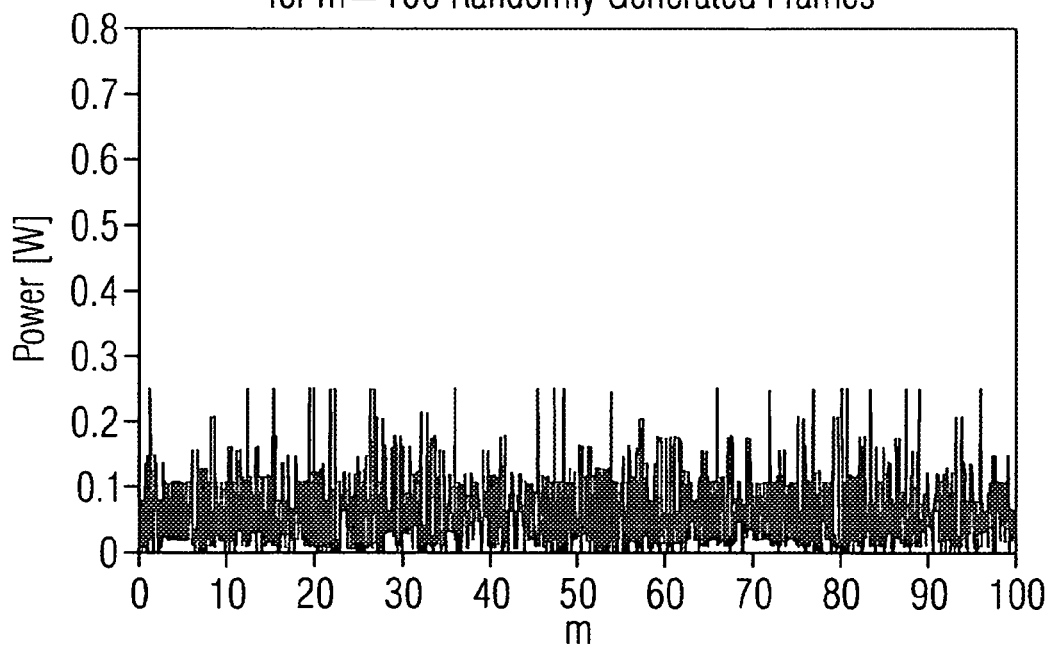
FIG. 18 is a graph that shows a power envelope of proposed OFDM system for m=100 randomly generated frames.
Figure 19:
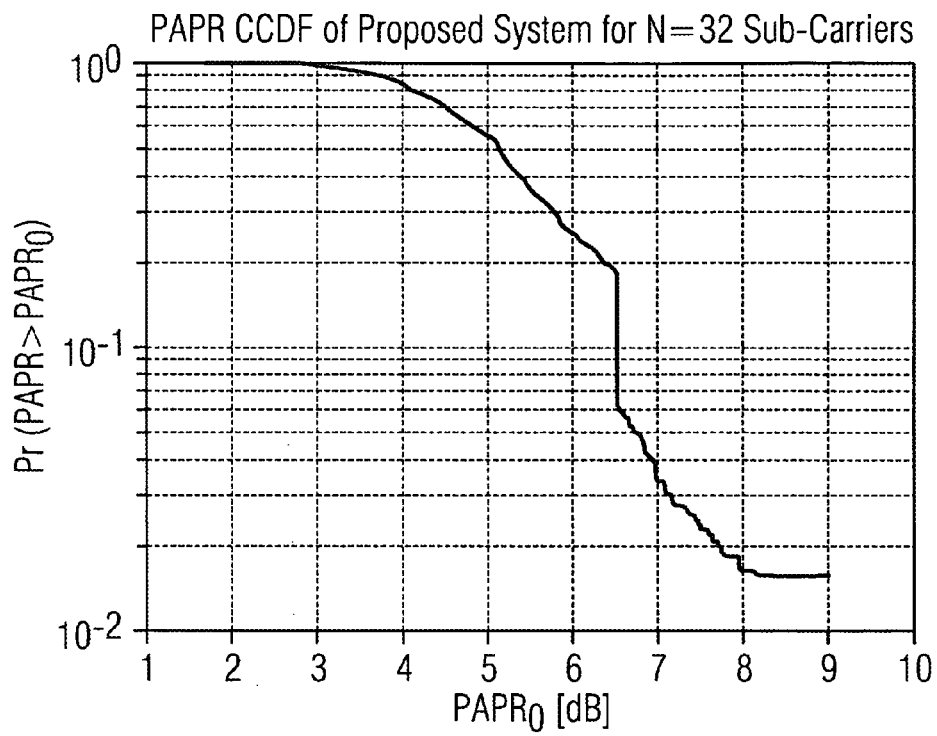
FIG. 19 is a graph that shows PAPR CCDF of proposed system for N=32 sub-carriers.
Figure 20:
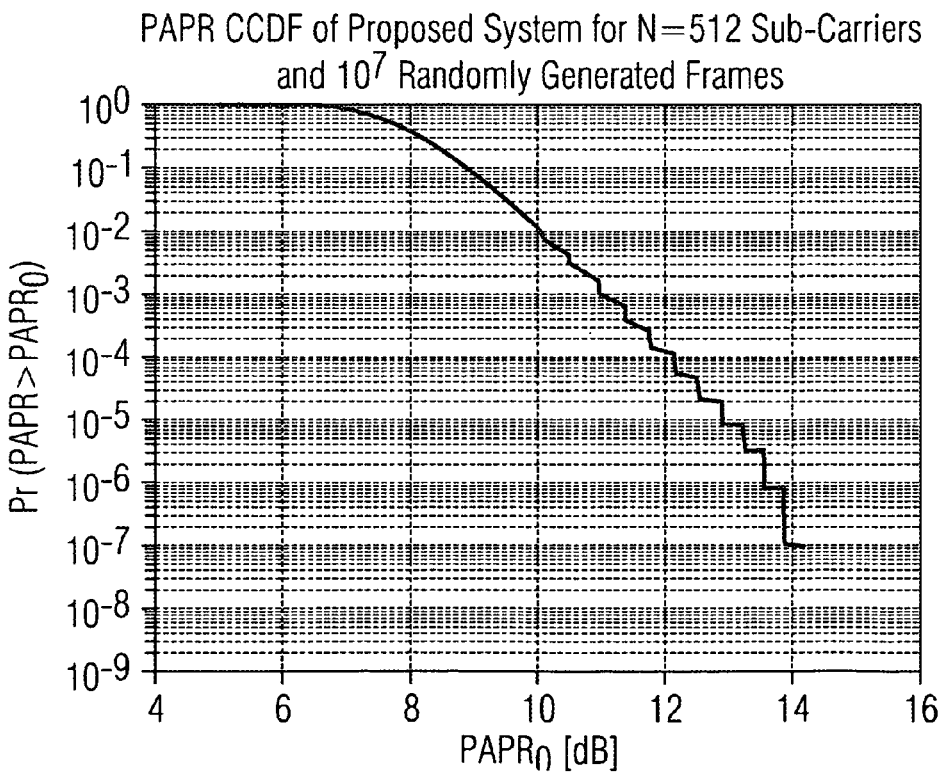
FIG. 20 is a graph that shows PAPR CCDF of proposed system for N=512 sub-carriers and $10^7$ randomly generated frames.

High PAPR reduction. It was also derived that the amount of PAPR reduction is 6.02 dB. In comparison to other methods, which on average gain about 3 dB (for a given number of sub-carriers), this is a very high PAPR reduction. In linear scale, this means that we are able to reduce dynamic range of the OFDM signal to a quarter. FIG. 17 shows the power envelope of standard OFDM system with 16 sub-carriers for m=100 random frames. It can be seen that the envelope varies considerably, exhibiting several high peaks. FIG. 18 shows the power envelope of the proposed system for the same parameters. It is apparent that the power envelope variation is much less and the peaks are eliminated. Theoretical bound on PAPR reduction has been validated against simulations, for number of sub-carriers N=32 and N=512. For FFT size N=32, all possible input sequences ($2^{24}$ sequences) were generated (redundant bits are inserted, which together with 24 information bits gives 32 coded bits for BPSK modulation). PAPR results are presented in the form of Complementary Cumulative Distribution Function (CCDF) in FIG. 19. For the common system, PAPR in the worst case is 15.05 dB. In the proposed system, a reduction of 6.02 dB is expected, resulting in PAPR of 9.03 dB. This is exactly what we can observe in FIG. 19. Since it is practically impossible to generate all possible input sequences for FFT size 512, we used statistical approach and generated $10^7$ random sequences. The results are shown in FIG. 20 in the form of CCDF again. For the common system, PAPR for the worst case is 27.09 dB. As can be seen from FIG. 20, theoretical PAPR reduction bound of 6.02 dB was not exceeded or achieved for $10^7$ random sequences, which shows that our proposal is applicable also for large FFT sizes. Note that "stairs" on the CCDF only mean that there is a set of discrete values that PAPR may obtain.

Figure 16:
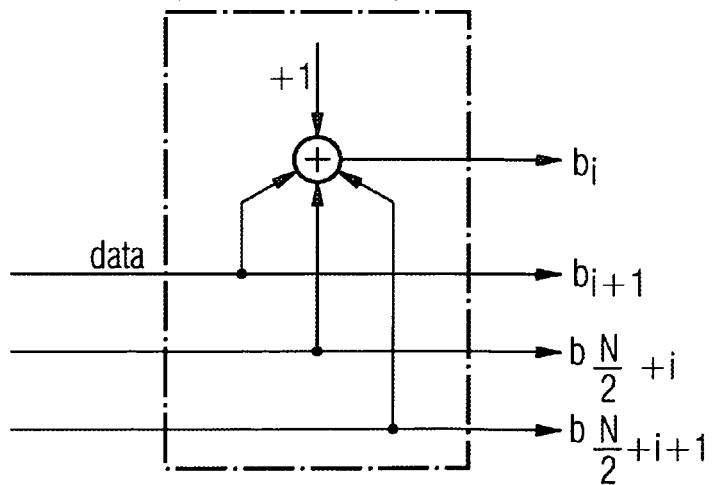
FIG. 16 is a block diagram of a complementary parity encoder.

Low complexity implementation. FIG. 16 shows the principal scheme of the Complementary Parity Encoder. Three input data bits are, in a systematic way, appended by one redundant bit computed as their complementary parity. It is clear that complexity of the encoder is minimal since it has only of exclusive or (XOR) operation. FIG. 21 shows the block diagram of the suggested transmitter for OFDM system using complementary parity code (for simplicity, we have omitted cyclic prefix insertion since it has no influence on envelope power spectrum of the resulted OFDM signal). After serial to parallel conversion, data bits are split into N/4 groups, each of three bits. The fourth bit is generated by the encoder assigned to each group. Encoded outputs are formed in the order which guarantees desired PAPR. Subsequently, BPSK modulation is applied followed by IFFT modulation and, in the end, parallel to serial conversion to produce OFDM baseband signal. In FIG. 22, a receiver with all reverted transmitter's operations is depicted.

Error correction. It was shown that the conditions derived to ensure PAPR reduction represent coding by complementary parity code. The output of each encoder introduces redundancy by inserting additional bit. This redundancy can be represented by the code rate which is defined as a ratio of number of information bits to number of all bits. As energy per coded bit decreases with decreased code rate, the performance of the system degrades proportionally. Such an effect can be recognized in many applications based on coding for PAPR reduction and is considered as a primary drawback. However, if we apply soft decoding in the proposal, it is possible to correct, at least to some extent, all the bits involved in the parity relation of (25). Since each symbol $a_i$ is included in equations (19), each of the N bits in the OFDM frame could be corrected. This fact can be used to compensate for the redundancy and thus for improving performance of the system. FIG. 23 compares performance of the following three systems. The first one (solid line) represents performance of the OFDM BPSK system without redundancy. The second one (dotted line) uses redundancy only for PAPR reduction, and, as expected, the performance is worse. The last one (dash-dotted line) depicts improved performance when redundancy is used also for error correcting. All these simulations were performed in AWGN channel and the performance was evaluated by uncoded BER. It can be seen that by using our proposal, it is possible not only to decrease PAPR but also to compensate for the decreased energy per coded bit and reach better performance than the reference system.

No restrictions for FFT size (number of sub-carriers). As it was mentioned in the previous chapter, there are methods which can combine PAPR reduction and error controlling. However, they are either too complex from the implementation point of view or not designed for higher number of sub-carriers or both. These methods often become too complex as the number of sub-carriers increases, making them impractical for real system applications. The complexity of our proposal grows linearly with the number of sub-carriers, as well. However, this means only increased demand for XOR operations which is not a limited factor from computational and implementation complexity point of view.

As a conclusion, the presented proposal combines features like high PAPR reduction (6.02 dB) independently on number of sub-carriers, low complexity implementation and improved performance.

A further novel concept of PAPR reduction designated for the OFDM system with BPSK modulation by SPM is proposed. From a certain point view, techniques for PAPR reduction can be divided into two main categories.

The first one relies on coding and introduces redundancy which is used to decrease PAPR. Methods of this kind can exhibit high PAPR reduction, e.g. up to 6.02 dB, however, at the expense of degraded spectral efficiency caused by introduced redundancy. Therefore, it is intended to use them in the applications that do not require very high data rates but require low PAPR, e.g. uplink data transmissions.

The second category includes methods, like Constellation Shaping (CS), that do not employ redundancy for PAPR reduction but the gain is smaller than e.g. that of the first proposal.

The proposal can be considered as a balance between both these categories. It is based on a unique combination of coding and position modulation. These features enable to reach PAPR reduction gain that is not as high as in the first proposal, but still higher than the methods based on CS or other known methods guarantee. In fact it is based on coding with indirectly decreased redundancy. Hence, the gain in PAPR reduction is not as high as in the first solution but the code rate is increased to ⅞.

There are several advantages gained by the proposed scheme. It is to point out the most significant ones.

Block approach. It was proposed to use position modulation for reduction of the redundancy. For higher number of sub-carriers, efficiency of SPM degrades due to decreasing code rate. Therefore, it is proposed for higher number of sub-carriers to use so called block approach. Since the efficiency of SPM is the highest for 16 sub-carriers, this number was selected as a basis. Larger number of sub-carriers, which has to be integer powers of two, to guarantee PAPR gain of approx. 4 dB, has to be then constructed from this basis. Such an approach does not limit any practical applications, rather, on the contrary, exhibits a big variability. It can be used either in TDMA or FDMA manner. For example, if it is necessary to reach high bit rates, high frequency diversity or transmit information in a short burst, then TDMA scheme can be used. This means that all blocks (bases) can be assigned to a certain user in a certain time slot. On the other hand, block approach brings plenty of benefits also in case of FDMA concept. For instance, OFDM systems employing block approach, which is known as OFDMA, allow for frequency hopping. The hopping enables to compensate low frequency diversity in comparison to OFDM-TDMA scheme, and to average the interference, which in the end means higher capacity. Further, it allows for FDMA intercell allocation which is important for clustering and for requirements on time synchronization accuracy (time synchronization accuracy is a primary drawback of OFDM-TDMA, which limits the size of cluster). In addition, for low mobility with OFDMA concept there is minimum pilot overhead compared to TDMA scheme, etc.

Quasi-constant PAPR reduction. In the previous section we have proved that the amount of PAPR reduction for the basis, i.e. 16 sub-carriers is 4.08 dB. For higher number of sub-carriers the gain in PAPR reduction decreases from 4.08 dB to 3.91 dB which corresponds to the case when 32 sub-carriers are used. It was shown that 32 sub-carriers represent the worst case since for higher number of sub-carriers the PAPR reduction gain converges back to 4 dB. This is very important characteristic for practical applications which mainly employ large number of sub-carriers (FFT sizes), typically 128, 256, 512 or even higher. In those cases, PAPR reduction is almost 4 dB, which means discrepancy against the basis less than 0.09 dB. The gain of approx. 4 dB is guaranteed only if larger number of sub-carriers can be expressed as integer powers of two. This does not limit the use in practical applications since also fast algorithm for Fourier transform is defined for sizes expressed as integer powers of two. Because the gain of PAPR reduction for larger number of sub-carriers converges to 4 dB it is used the term quasi-constant rather than constant for PAPR reduction even if discrepancies between different amounts of sub-carriers are negligible.

Figure 6:
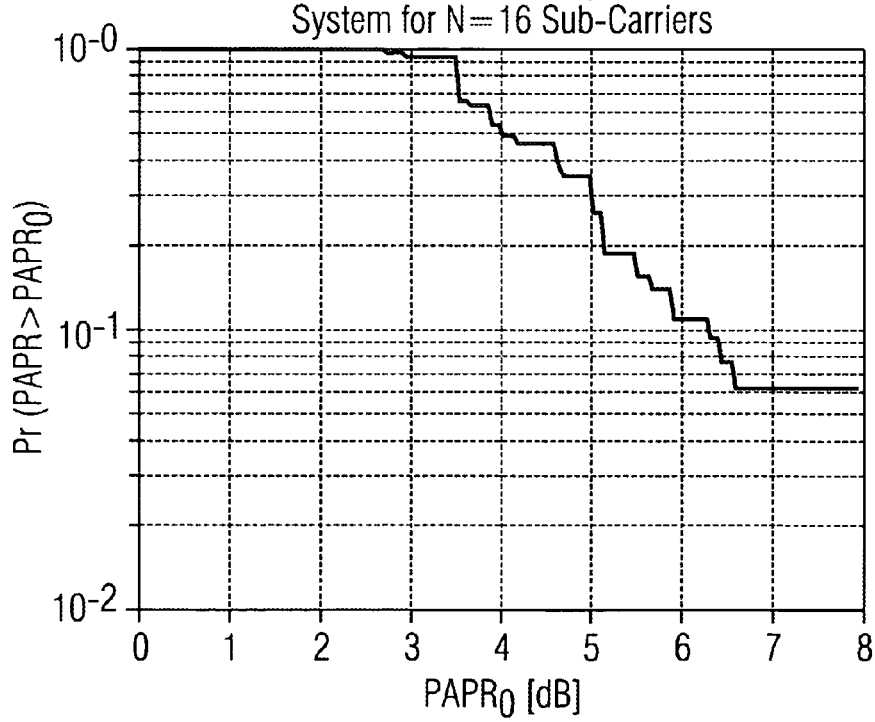
FIG. 6 is a graph that shows PAPR CCDF of proposed system for N=16 sub-carriers.

Validation of the theoretical bounds on PAPR reduction has been carried out by simulations. Validating PAPR reduction for three instances is needed. The first two represent BPSK OFDM system with N=16 and N=32 sub-carriers, for which all possible input sequences ($2^{14}$ and $2^{28}$ sequences) were generated. (For example, if N=32, 8 redundant bits are inserted (4 in each basis), however, with the aid of SPM the redundancy is decreased to half (only 4 bits). This gives together with 28 information bits 32 coded bits for BPSK modulation.) The third instance corresponds to the system with N=512 sub-carriers. Since it is practically impossible to generate all possible input sequences for FFT size 512, statistical approach and generated $10^7$ random sequences are used. PAPR results for all cases are presented in the form of Complementary Cumulative Distribution Function (CCDF). FIG. 6 depicts the CCDF for N=16 sub-carriers. For this system, a PAPR reduction of 4.08 dB (from 12.04 to 7.96) is expected. This is what we observe in this figure. FIG. 7 depicts CCDF for N=32 sub-carriers. For the common system, PAPR in the worst case is 15.05 dB. In the proposed system, according to the theoretical analysis, a reduction of 3.91 dB is expected. This gives PAPR of 11.14 dB for the worst case. As can be observed from FIG. 7, the same value was reached by the simulation. The results for N=512 are shown in FIG. 8. For the common system, PAPR for the worst case is 27.09 dB. FIG. 8 shows that theoretical PAPR reduction bound of 3.92234 dB was not exceeded or achieved for $10^7$ random sequences, which proves that our proposal is applicable also for large FFT sizes. Note that "stairs" on the CCDF only mean that there is a set of discrete values over which PAPR is defined. In FIG. 9, the gain in PAPR reduction is plot for different number of sub-carriers, N. It is seen that the gain grows slightly for higher numbers of sub-carriers. It is considered the powers of 2 from the range N=32 to N=2048. As can be observed, the smallest gain is achieved for 32 sub-carriers. Anyway, real systems use at least 64 sub-carriers, which promise a slightly higher gain. Remember that for N=16 sub-carriers, the gain is 4.08 dB. There is a conclusion at this point that the PAPR gain of the proposed scheme is quasi-constant with respect to the number of sub-carriers with the value of roughly 4 dB.

Figure 10:
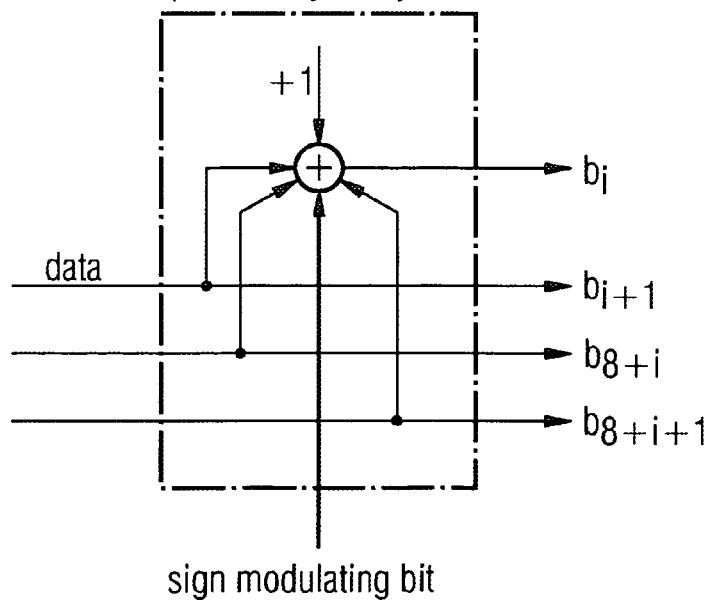
FIG. 10 is a block diagram of a complementary parity encoder.
Figure 11:
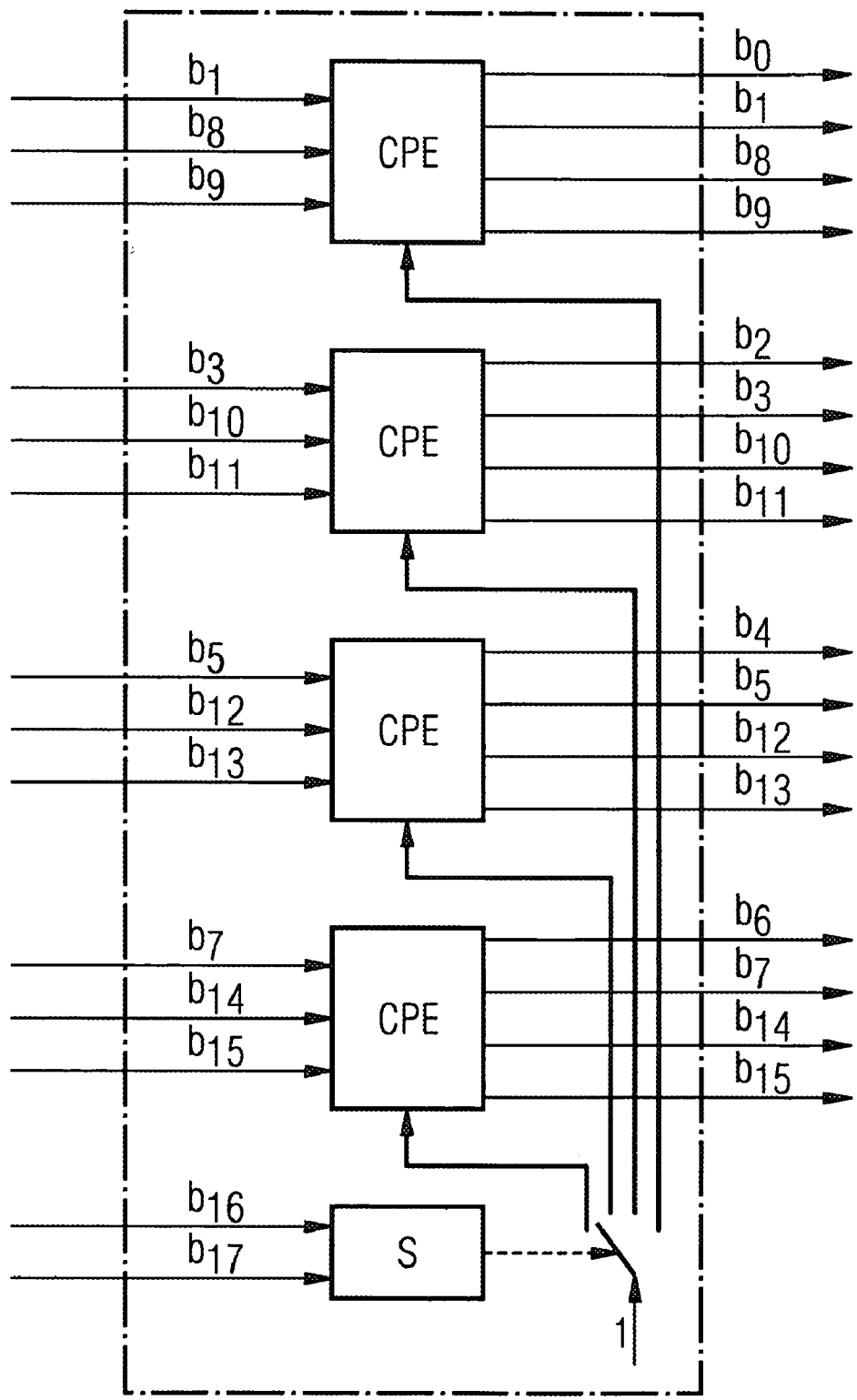
FIG. 11 is a block diagram of a basis encoder.

Low complexity implementation. FIG. 10 shows an exemplary scheme of the Complemented Parity Encoder. Three input data bits are, in a systematic way, appended by one redundant bit. This non-systematic redundant bit is computed as the sum-modulo 2 over the data bits, fixed-one bit and finally the sign modulating bit. It is clear that the complexity of the encoder is minimal since it has only of exclusive-or (XOR) operation. FIG. 11 depicts the scheme of the Basis Encoder. 14 information bits are input to the basis and 16 bits run out of the basis. The numbering of the information bits in the scheme is chosen to match the output bits, rather than to follow some ascending order. There are four Complementary Parity Encoders (CPE) employed in the basis, each producing one redundant bit. The Selector (S) determines which of the sets of conditions (I), (II), (III) or (IV) will be applied, depending upon the last 2 information bits. Having chosen one set, Selector connects the logical 1 input to one of the four CPE by controlling the switch. This corresponds to the "+" sign in the given set of conditions, i.e. common parity code is applied. Notice that in 75 percent occasions, the sign modulating fixed-one bit remains unplugged to the given CPE, which corresponds to "−" sign in the conditions (complementary parity code is applied).

Figure 12:
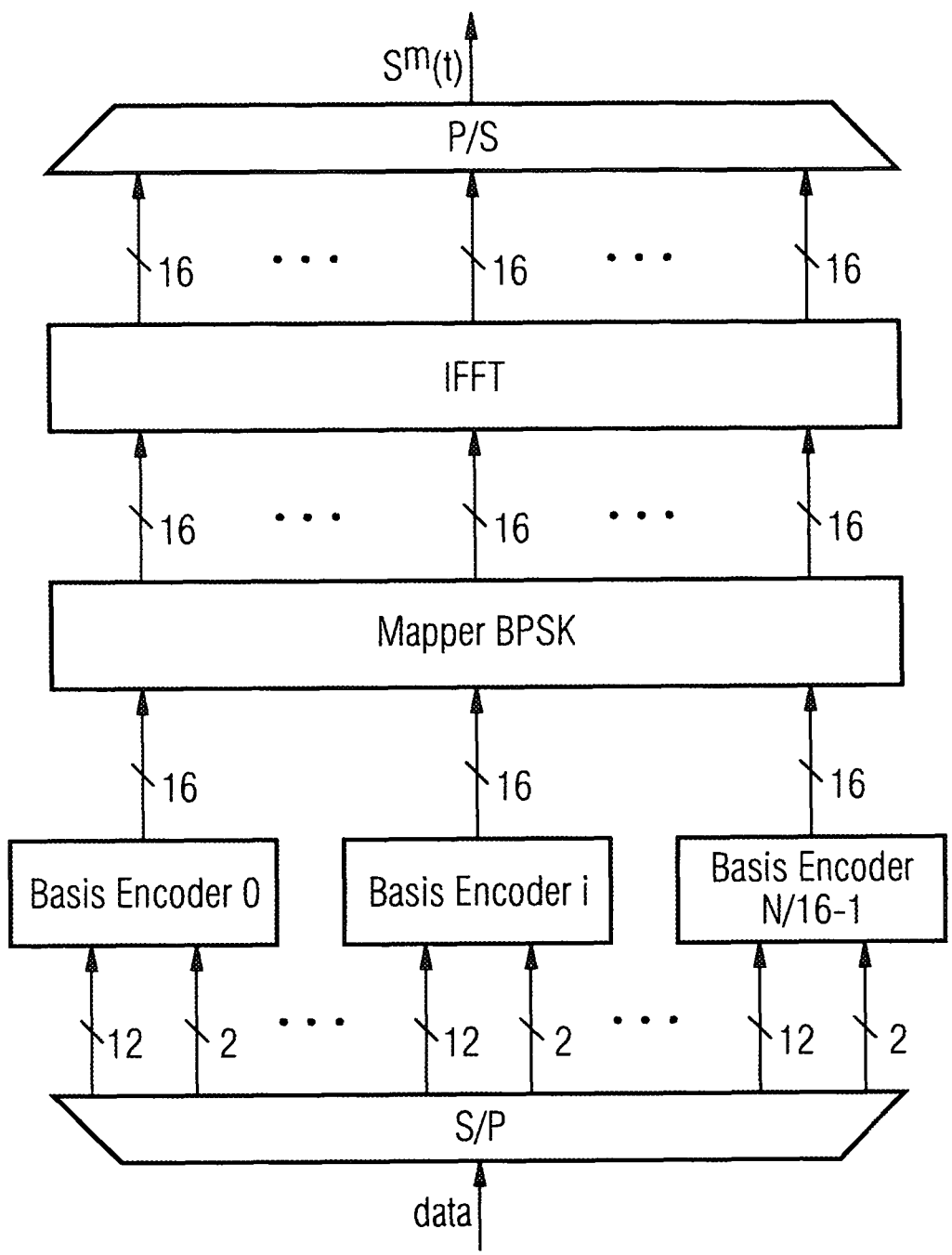
FIG. 12 is a block diagram of a proposal for BPSK OFDM transmitter.
Figure 13:
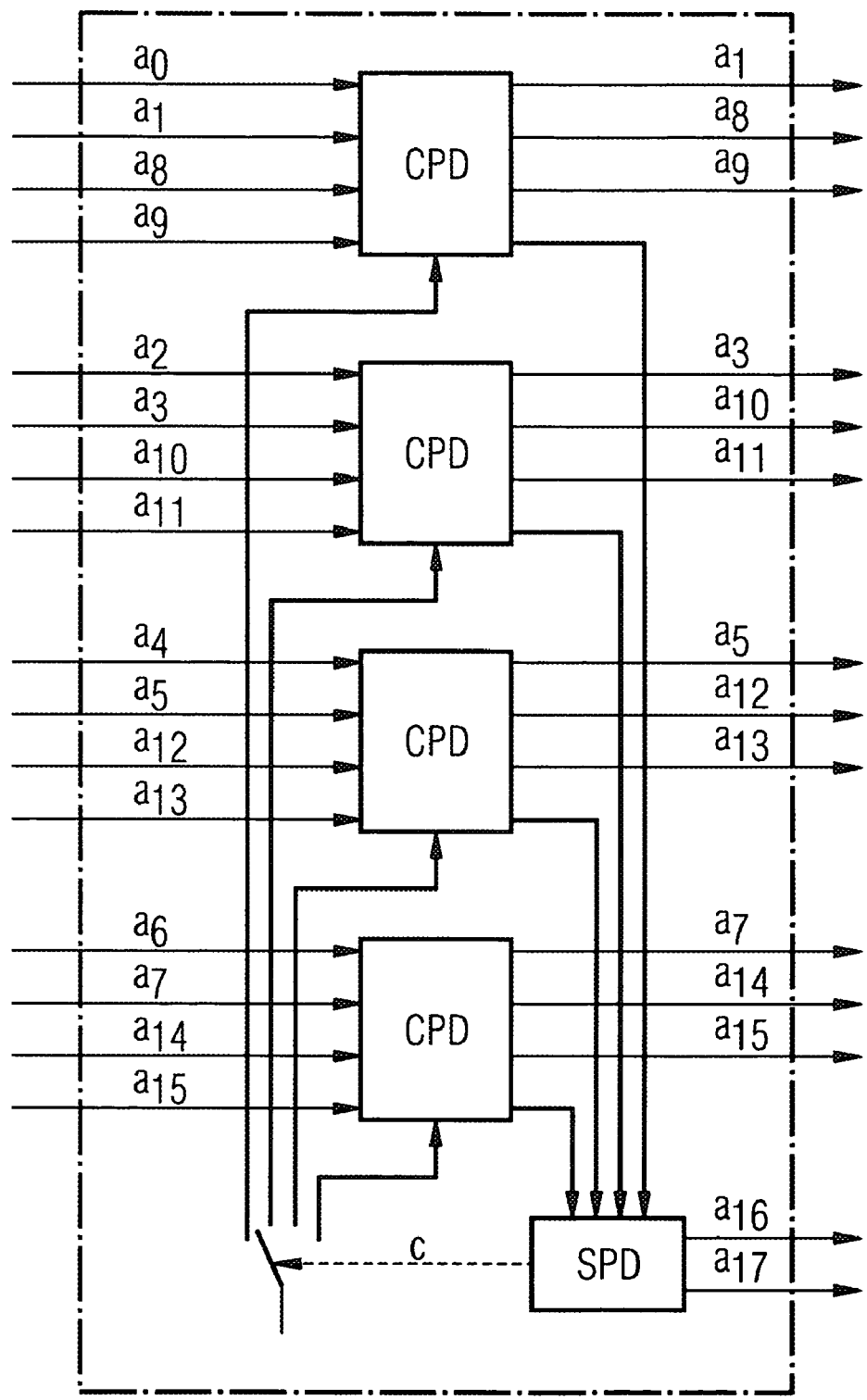
FIG. 13 is a block diagram of a basis decoder.

FIG. 12 shows the block diagram of the suggested transmitter for BPSK OFDM system. After serial to parallel conversion, data are split into (N/16) groups, each of 14 bits. These bits are encoded by the above explained procedure and further modulated to the BPSK symbols. IFFT transform, subsequently followed by parallel to serial conversion, gives the time domain samples of the OFDM signal. In FIG. 13, proposed scheme of the Basis Decoder is depicted. It has four Complementary Parity Decoders (CPD). Output of each decoder is sent as a soft value, rather than absolute one, to the block called Sign Position Demodulator (SPD). It estimates which of CPDs exploits common parity encoding procedure. The estimation is carried out by simple division (which is equal to multiplication for BPSK symbols) of the redundant symbol and the information symbols. For instance, if the condition for the redundant symbol $a_0$ was $a_0=-a_1a_8a_9$, the division should ideally yield $$\frac{a_0}{a_1a_8a_9} = a_0a_1a_8a_9 = -1.$$

Of course, the estimation will not be exactly −1 due to channel characteristics and imperfections. Ideally, three negative and one positive estimates should be provided to SPD. If this is not the case, for the position of sign "+" a soft approach is used, that is, the sign "+" position is selected by the value, which is the greatest one. After the decision has been made, SPD generates according to the detected position 2 further information bits. Then it controls the switch which in turn passes the control signal c to the corresponding CPD. The CPD which has received the control signal c uses the common parity decoding while the other CPDs work in default mode of the decoding, i.e. complementary parity decoding. As soon as the CPD knows the mode of decoding, it can also perform error correction. This is performed if the condition for the redundant symbol (we consider hard decision of the symbols in the relation) does not hold, and the correction is made based on the reliability of the symbols.

Figure 14:
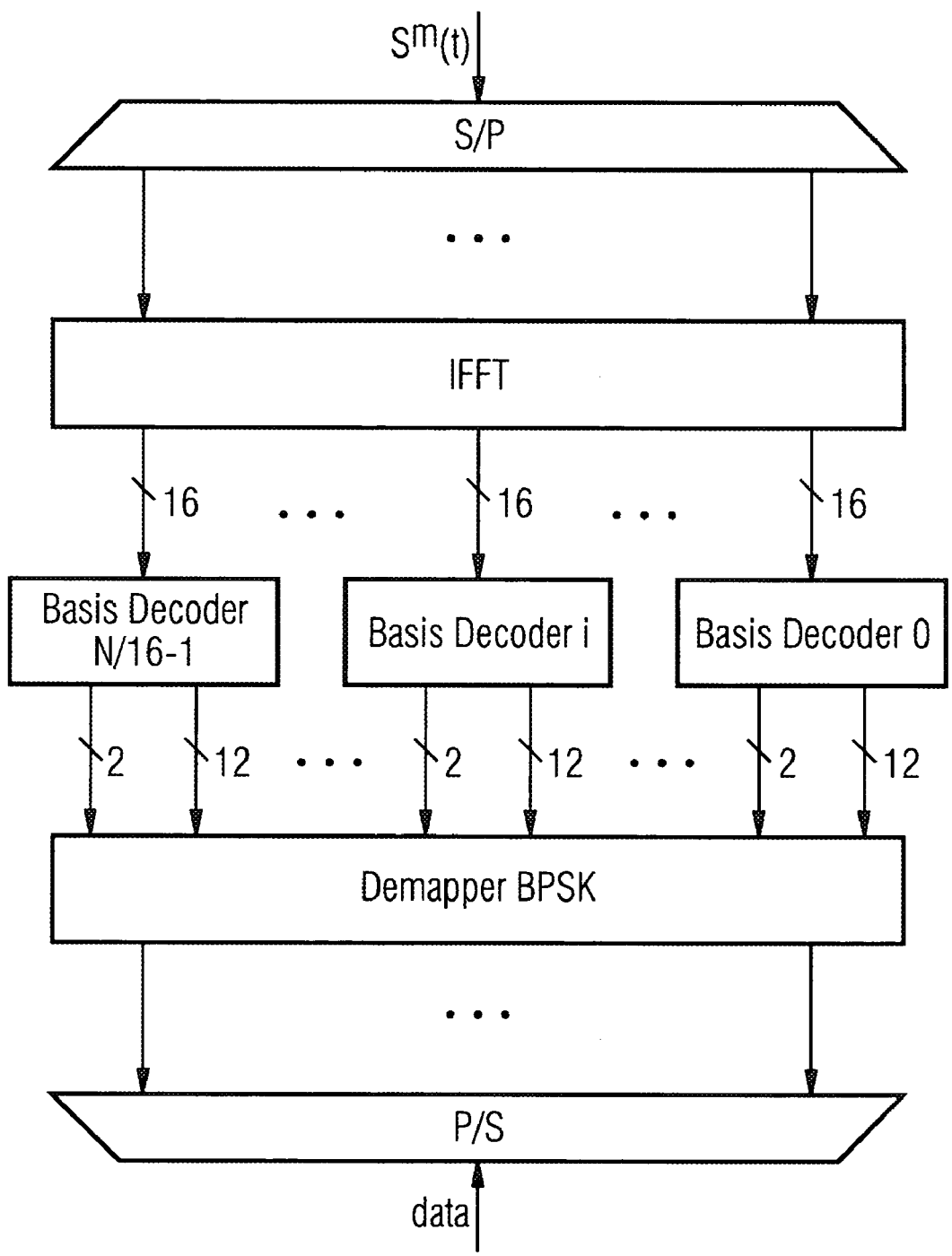
FIG. 14 is a block diagram of a proposal for BPSK OFDM receiver.

In FIG. 14, the principal scheme of the receiver is depicted. As can be seen, its structure is not directly reversed to that of the transmitter. The reason is that decoding is performed over the BPSK symbols.

Figure 15:
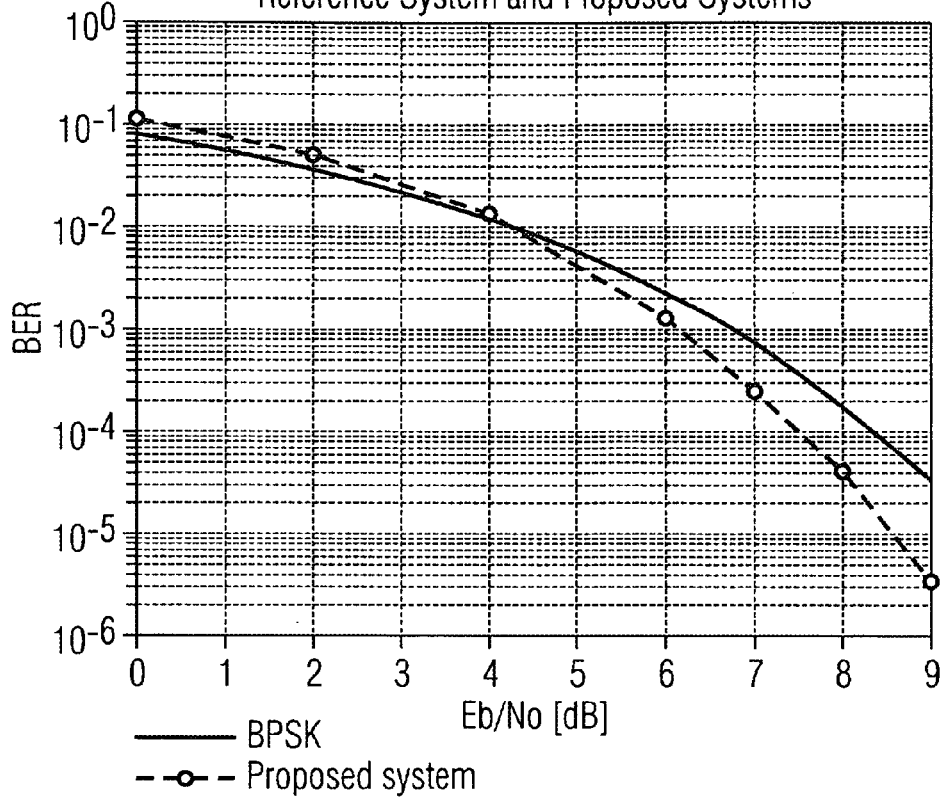
FIG. 15 is a graph that shows comparison of performance between the reference system and proposed systems.

Error correction. It was shown that the conditions derived to ensure PAPR reduction represent either common or complementary parity coding. The output of each encoder introduces redundancy by inserting parity bit. The amount of redundancy is expressed by the code rate which is defined as a ratio of the number of information bits to the number of all bits. As the energy per coded bit decreases with decreased code rate, the performance of the system degrades proportionally. Such an effect can be recognized in many applications based on coding for PAPR reduction and is considered as a primary drawback. However, applying soft decoding in our proposal, it is possible to correct, at least to some extent, all the bits involved in the parity relation. In addition, the core of the proposed solution lies in indirect reduction of introduced redundancy by SPM. As it was discussed in previous sections, SPM indirectly decreases redundancy by modulating the data on sign "+" position while preserving the volume of redundancy necessary for PAPR reduction and error correction. Now, it is to observe plausibility of this approach by uncoded BER in AWGN channel. FIG. 15 compares the proposed solution (dashed line) with common OFDM BPSK system (solid line). It shows that performance of the system employing SPM is worse for low Eb/No values. This comes from unreliable procedure, the goal of which is to determine CPD using common parity decoding. Additionally, the performance is also degraded by the introduced redundancy (code rate=⅞). For low Eb/No unreliability of SPD is high resulting in wrong bit generating. Therefore, the performance of the proposed system is worse in comparison to the reference system. However, with rising Eb/No, reliability of SPD increases causing successive dropping in performance degradation. This can be observed in the range of Eb/No values from 0 to 4 dB. Beyond Eb/No=4 dB, performance of the proposed system significantly improves, since reliability of SPD is high enough and thus error correction can work properly. It can be seen that by using our proposal it is possible not only to decrease PAPR but, from a certain Eb/No value, also to compensate for the decreased energy per coded bit and reach better performance than the reference system.

No restrictions for FFT size (number of sub-carriers). Methods that combine PAPR reduction and error controlling usually suffer from high implementation and computational complexity or are not designed for higher number of sub-carriers at all in terms of PAPR reduction ability. The complexity of our proposal grows linearly with the number of sub-carriers. However, this means only increased demand for XOR operations which is not a limiting factor from computational and implementation complexity point of view. Our proposal guarantees PAPR reduction for FFT sizes which may be expressed as a power of 2. This is not a restriction as real applications use fast algorithm for Fourier transform (FFT) that is defined only for these sizes.

As a conclusion, the presented proposal uses a unique SPM (Sign Position Modulation) for indirect redundancy reduction of an OFDM system employing coding for PAPR reduction. The proposed system guarantees quasi-constant PAPR reduction and is almost independent of number of sub-carriers, exhibits low complexity implementation and improved performance.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for reducing Peak-to-Average Power Ratio in an orthogonal frequency division multiplex transmission system, comprising:
   complementary parity coding in the orthogonal frequency division multiplex transmission system by coding rules derived from an appropriate auto-correlation property of transmitted symbol sequences, the auto-correlation property taking on at least one minimal but non-zero value for +N/2 and −N/2 shifts, where N stands for a length of the transmitted symbol sequences;
   inserting redundant symbols, defined by said complementary parity coding, into a symbol sequence after said complementary parity coding;
   transmitting further bits in the symbol sequences by a Sign Position Modulation; and
   determining prototypes, by a position of a sign, which are mutually exclusive, providing that exactly one prototype takes on an opposite value compared to other prototypes in a set.

2. The method according to claim 1, further comprising: employing a combination of complementary parity coding together with sign position modulation, and suppressing a redundancy introduced by coding while preserving correction capabilities of the complementary parity coding.

3. The method according to claim 1, further comprising conveying further information indirectly using mutually exclusive prototypes.

4. The method according to claim 3, further comprising applying binary phase shift keying for the orthogonal frequency division multiplex transmission system.

5. The method according to claim 4, further comprising error correcting using complementary parity coding along with Peak-to-Average Power Ratio reduction.

6. The method according to claim 5, wherein a fast Fourier transform size is freely selectable.

* * * * *